US011211786B2

(12) United States Patent
Mascarenhas et al.

(10) Patent No.: US 11,211,786 B2
(45) Date of Patent: Dec. 28, 2021

(54) SMART MODULE FOR A CIRCUIT BREAKER

(71) Applicant: ABB Schweiz AG, Baden (CH)

(72) Inventors: Leonardo Dorea Mascarenhas, Agawam, MA (US); Tapas Ranjan Rout, Hyderabad (IN); Rafael Enrique Higuera, Durham, NC (US)

(73) Assignee: ABB Schweiz AG, Baden (CH)

(*) Notice: Subject to any disclaimer, the term of this patent is extended or adjusted under 35 U.S.C. 154(b) by 1020 days.

(21) Appl. No.: 15/806,764

(22) Filed: Nov. 8, 2017

(65) Prior Publication Data

US 2019/0140439 A1   May 9, 2019

(51) Int. Cl.
| H02H 3/00 | (2006.01) |
| H02H 7/00 | (2006.01) |
| H02H 7/22 | (2006.01) |
| H01H 9/16 | (2006.01) |
| H01H 71/04 | (2006.01) |

(Continued)

(52) U.S. Cl.
CPC ............ *H02H 7/222* (2013.01); *H01H 9/167* (2013.01); *H01H 9/168* (2013.01); *H01H 71/04* (2013.01); *H01H 71/08* (2013.01); *H02B 1/46* (2013.01); *H02B 13/005* (2013.01); *H02B 15/00* (2013.01); *H02H 1/0007* (2013.01); *H01H 71/125* (2013.01); *H01H 2300/03* (2013.01); *H02B 1/42* (2013.01)

(58) Field of Classification Search
CPC ....... H01H 71/08; H02H 7/222; H02H 1/0007
USPC .................................................... 361/42, 64
See application file for complete search history.

(56) References Cited

U.S. PATENT DOCUMENTS

| 7,570,470 B2 | 8/2009 | Holley |
| 8,169,331 B2 | 5/2012 | Darr |

(Continued)

FOREIGN PATENT DOCUMENTS

| GB | 2476448 B | 7/2015 |

OTHER PUBLICATIONS

Illias et al., "Fault diagnosis of GIS switchgear using historical data", Electrical Insulation Conference (EIC), 2014, pp. 82-86, 2014, Philadelphia, PA.

(Continued)

*Primary Examiner* — Jared Fureman
*Assistant Examiner* — Lucy M Thomas
(74) *Attorney, Agent, or Firm* — Armstrong Teasdale LLP

(57) ABSTRACT

A communications and processing module is provided. The communications and processing module is electrically coupleable to a circuit breaker to provide the circuit breaker with additional capabilities. The communications and processing module includes a housing, at least one electrical contact positioned in the housing, an output lug positioned in the housing, wherein an electrical path is defined between the at least one electrical contact and the output lug, at least one sensor positioned in the housing and operable to sense at least one operating condition of the circuit breaker, and at least one communications interface positioned in the housing and communicatively coupled to the at least one sensor, the communications interface operable to receive data from the at least one sensor that is indicative of the at least one sensed operating condition to facilitate exporting the received data to a remote computing device.

20 Claims, 34 Drawing Sheets

(51) Int. Cl.
*H01H 71/08* (2006.01)
*H02B 1/46* (2006.01)
*H02B 13/00* (2006.01)
*H02B 15/00* (2006.01)
*H02H 1/00* (2006.01)
*H01H 71/12* (2006.01)
*H02B 1/42* (2006.01)

(56) References Cited

U.S. PATENT DOCUMENTS

| | | |
|---|---|---|
| 8,760,825 B2 | 6/2014 | Erger et al. |
| 9,595,825 B2 | 3/2017 | Curt |
| 9,608,444 B2 | 3/2017 | Pugh et al. |
| 9,618,548 B1 | 4/2017 | Melecio Ramirez et al. |
| 2012/0111596 A1* | 5/2012 | Mortun ................ H01R 13/447 |
| | | 174/50.5 |
| 2016/0225562 A1 | 8/2016 | Franks et al. |

OTHER PUBLICATIONS

Kai et al., "Application of Key Performance Indicator in circuit breaker online monitoring", Innovative Smart Grid Technologies—Asia (ISGT-Asia), 2016 IEEE, pp. 844-849, 2016, Melbourne, VIC.

* cited by examiner

SMART MODULE FOR A CIRCUIT BREAKER

BACKGROUND

The field of the disclosure relates generally to circuit breakers, such as ground fault circuit interrupt (GFCI) circuit breakers, arc fault circuit interrupt (AFCI) circuit breakers, and/or dual function circuit interrupt (DFCI) circuit breakers, and more particularly, to communications and processing modules that may be coupled to existing circuit breakers to provide those circuit breakers with additional capabilities.

Circuit breakers are well known devices for protecting against electrical faults. They are operable to open a circuit when a fault condition is detected. For example, a GFCI circuit may open if there is a current imbalance between a current carrying line and a neutral line, indicating that current is flowing outside of the circuit. In addition, circuit breakers typically include a manual switch for opening the circuit manually.

More recently, so-called "smart" or "intelligent" circuit breakers have been developed. At least some known "smart" circuit breakers perform the traditional functions of a circuit breaker, but include a microprocessor for processing data. These "smart" circuit breakers may also include components to facilitate wired or wireless communications. For example, a group of smart circuit breakers may communicate and coordinate to open a circuit if a tripping condition is detected. In another example, a "smart" circuit breaker may notify another device that it has tripped.

Although "smart" circuit breakers provide additional capabilities, conventional circuit breakers are more pervasive than "smart" circuit breakers due to their lower cost and existing installed base. For example, the cost of upgrading an electrical system to include "smart" circuit breakers may be significant, as every conventional circuit breaker, regardless of age or condition, will likely need to be replaced. For these reasons, "smart" circuit breakers are typically used only in newer electrical installations.

BRIEF DESCRIPTION

In one aspect, a communications and processing module is provided. The communications and processing module is electrically coupleable to a circuit breaker to provide the circuit breaker with additional capabilities. The communications and processing module includes a housing, at least one electrical contact positioned in the housing and electrically coupleable to a load lug of the circuit breaker, an output lug positioned in the housing and electrically coupleable to a current carrying line, wherein an electrical path is defined between the at least one electrical contact and the output lug, at least one sensor positioned in the housing and operable to sense at least one operating condition of the circuit breaker, and at least one communications interface positioned in the housing and communicatively coupled to the at least one sensor, the communications interface operable to receive data from the at least one sensor that is indicative of the at least one sensed operating condition to facilitate exporting the received data to a remote computing device.

In another aspect, an electrical distribution center is provided. The electrical distribution center includes a plurality of circuit breakers, and a communications and processing module electrically coupled to a circuit breaker of the plurality of circuit breakers, the circuit breaker including a load lug. The communications and processing module includes a housing, at least one electrical contact positioned in the housing and electrically coupled to the load lug of the circuit breaker, an output lug positioned in the housing, wherein an electrical path is defined between the at least one electrical contact and the output lug, at least one sensor positioned in the housing and operable to sense at least one operating condition of the circuit breaker, and at least one communications interface positioned in the housing and communicatively coupled to the at least one sensor, the at least one communications interface operable to receive data from the at least one sensor that is indicative of the at least one sensed operating condition to facilitate exporting the received data to a remote computing device.

In yet another aspect, a method of monitoring a circuit breaker is provided. The method includes electrically coupling a communications and processing module to the circuit breaker, the communications and processing module including a housing, at least one electrical contact coupled to a load lug of the circuit breaker, an output lug, at least one sensor, and at least one communications interface communicatively coupled to the at least one sensor, wherein an electrical path is defined between the at least one electrical contact and the output lug, sensing, using the at least one sensor, at least one operating condition of the circuit breaker, and transmitting from the at least one sensor, data to the at least one communications interface to facilitate exporting the data to a remote computing device, the data indicative of the at least one sensed operating condition.

DRAWINGS

These and other features, aspects, and advantages of the present disclosure will become better understood when the following detailed description is read with reference to the accompanying drawings in which like characters represent like parts throughout the drawings, wherein.

Figure 1:
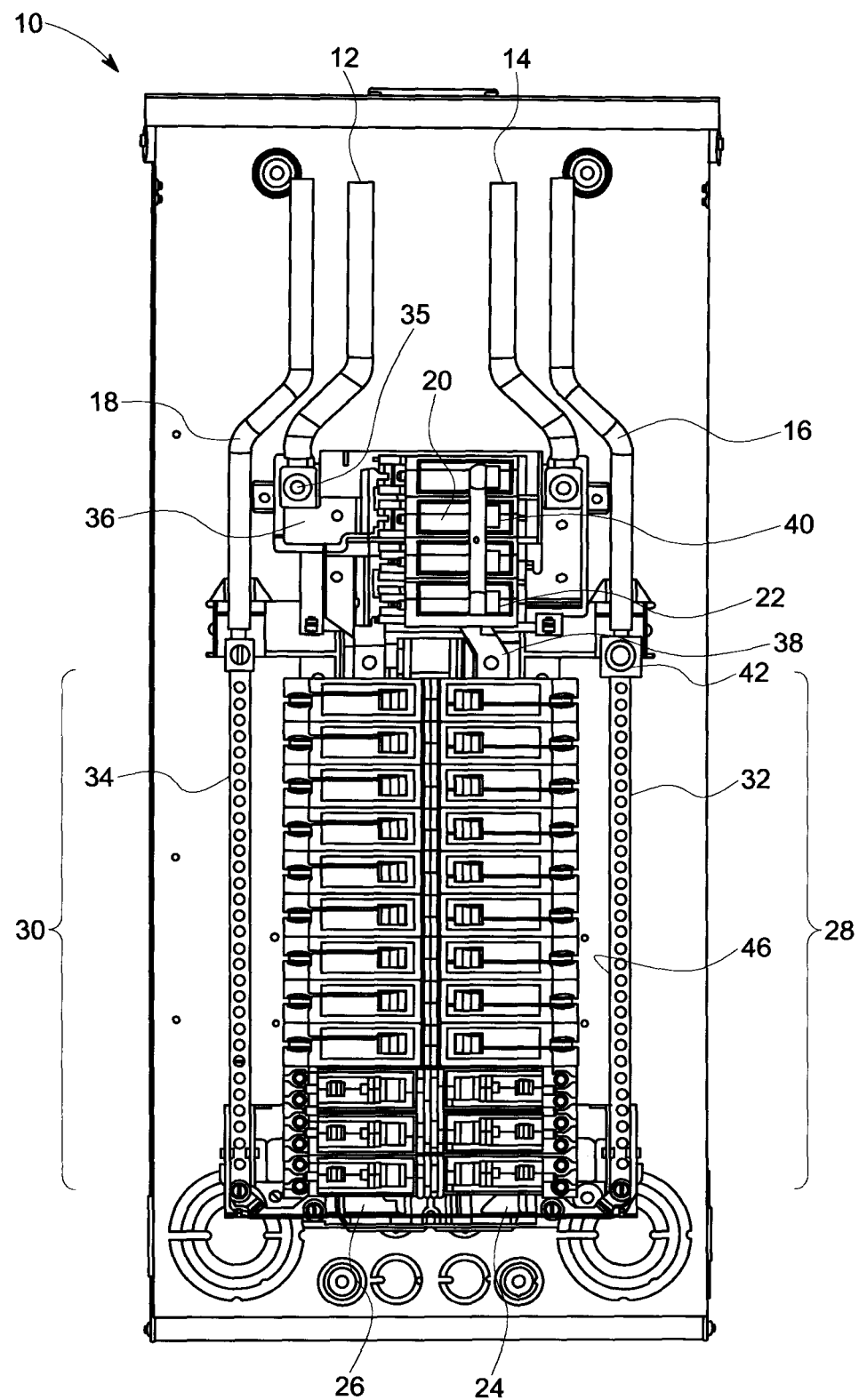
FIG. 1 illustrates a front view of an existing electrical distribution center.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a communications and processing module that can be coupled to a conventional circuit breaker to provide the conventional circuit breaker with additional capabilities. The communications and processing module includes a communications interface for exporting data to a remote computing device. The communications and processing module may further include a non-volatile memory operable to store sensed operating data for a circuit being protected by the circuit breaker. The non-volatile memory may be removable for exporting the stored data, and/or the communications and processing module may export the stored data over a wired and/or wireless communication channel to a remote computer system. The operating data may include current readings, voltage readings, power readings, energy usage readings, waveform captures, temperature measurements, transient events, and/or any other relevant conditions. This operating data may then be used for troubleshooting, a cloud based diagnostics software/database/management system, and/or branch circuit level metering.

Currently, there exists a large installed base of conventional circuit breakers lacking capabilities such as wired/wireless communications, decision making, monitoring, and reporting. At least some circuit breakers having a microcontroller for performing these functions, and these types of circuit breakers are becoming more common, but at a higher cost than a conventional circuit breaker. Furthermore, conventional circuit breakers may have a relatively long operating life, such that they will remain functional for the foreseeable future. Thus, while circuit breakers with advanced capabilities are available, they are relatively expensive.

Exemplary embodiments of a communications and processing module as described herein may be coupled to a conventional circuit breaker to provide additional capabilities to the conventional circuit breaker. Under at least some known systems, adding communications and processing capabilities to an existing electrical distribution center could only be accomplished by replacing conventional circuit breakers with new, advanced circuit breakers.

Figure 2:
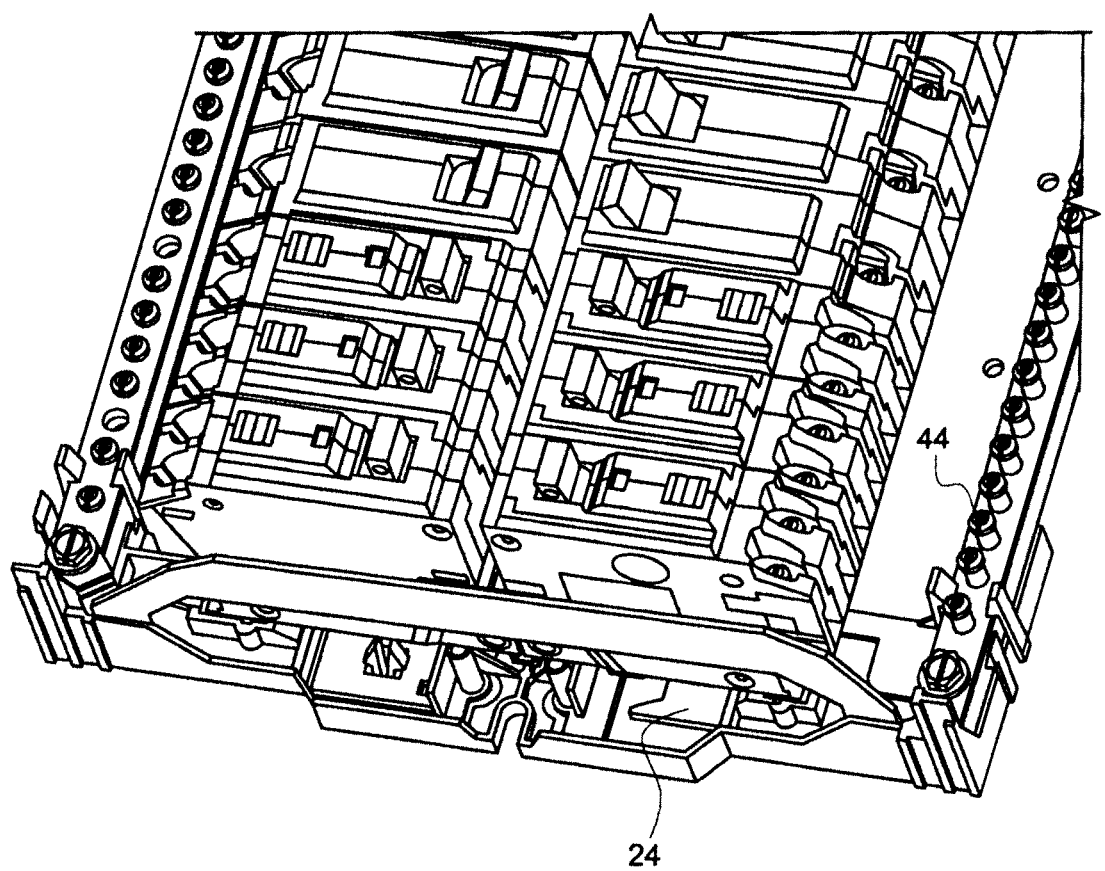
FIG. 2 illustrates a partial, close up, isometric view of an existing electrical center panel that may be used with the electrical distribution center shown in FIG. 1.

FIG. 1 illustrates a front view of an electrical distribution center 10. FIG. 2 illustrates a partial, close up isometric view of electrical distribution center 10 of FIG. 1. Electrical distribution center 10 includes a first current carrying, or conductive, wire 12, a second current carrying wire 14, a first neutral wire 16, and a second neutral wire 18. A first main circuit breaker 20 is electrically coupled in series with first current carrying wire 12 and a second main circuit breaker 22 electrically coupled in series with second current carrying wire 14. A first electrical bus 24 is electrically coupled in series with first main circuit breaker 20 and distributes current from first current carrying wire 12 to a first plurality of circuit breakers 28. Similarly, a second electrical bus 26 is electrically coupled in series with second main circuit breaker 22 and distributes current from second current carrying wire 14 to a second plurality of circuit breakers 30. First neutral wire 16 is connected to a first neutral bus 32 and second neutral wire 18 is connected to a second neutral bus 34. Accordingly, electrical distribution center 10 facilitates distributing electricity from an electrical source to a plurality of circuits through first electrical bus 24, second electrical bus 26, first neutral bus 32, and second neutral bus 34, with each circuit protected by at least one circuit breaker (e.g., one of first plurality of circuit breakers 28 or second plurality of circuit breakers).

First current carrying wire 12 and second current carrying wire 14 are both connected to an electrical power source. First current carrying wire 12 and second current carrying wire 14 operate substantially similar to one another. Accordingly, to simplify the description of electrical distribution center 10, only first current carrying wire 12 and related components will be described in detail.

First current carrying wire 12 is coupled to a lug 35 of a conductive bar 36. Conductive bar 36 has a first end having including lug 35, and a second end electrically coupled to first main circuit breaker 20. Further, a second conductive bar 38 electrically couples first main circuit breaker 20 to first electrical bus 24. First main circuit breaker 20 selectively opens and closes a circuit between first conductive bar 36 and second conductive bar 38. More specifically, in response to a tripping condition, such as excessive temperature or current, first main circuit breaker 20 automatically opens the circuit. Further, the circuit may be manually opened and closed by a switch 40.

As shown in FIGS. 1 and 2, circuit breakers may be mounted to first electrical bus 24. To facilitate mounting circuit breakers, first electrical bus 24 may have, for example, a rectangular cross section, and a mountable circuit breaker may have a complementary rectangular recess.

First neutral wire 16 is electrically coupled to first neutral bus 32 through a neutral lug 42. In the exemplary embodiment, first neutral bus 32 runs substantially parallel to first electrical bus 24. Further, as shown in FIG. 2, first neutral bus 32 includes at least one set screw 44 for securing a neutral wire to first neutral bus 32.

First plurality of circuit breakers 28 are coupled to first electrical bus 24. Each circuit breaker 28 includes a protection circuit electrically coupled to first electrical bus 24. The protection circuit selectively opens and closes an electrical circuit between first electrical bus 24 and a load lug (i.e., an electrical output of circuit breaker 28). The electrical circuit may be opened and closed automatically based on an amount of current passing through circuit breaker 28. Circuit breaker may 28 be switched manually as well, allowing for maintenance to be performed. In a GFCI, AFCI, or other advanced circuit protection device, circuit breaker 28 is also electrically coupled to first neutral bus 32 through neutral wire.

A space exists between each circuit breaker 28 and first neutral bus 32. This space is commonly referred to as a gutter 46. Gutter 46 may include, for example, current carrying wires electrically coupled to circuit breakers 28. In a GFCI, AFCI, or other advanced circuit protection device, gutter 46 may include a neutral line electrically coupling first neutral bus 32 to an associated circuit breaker 28.

Figure 3:
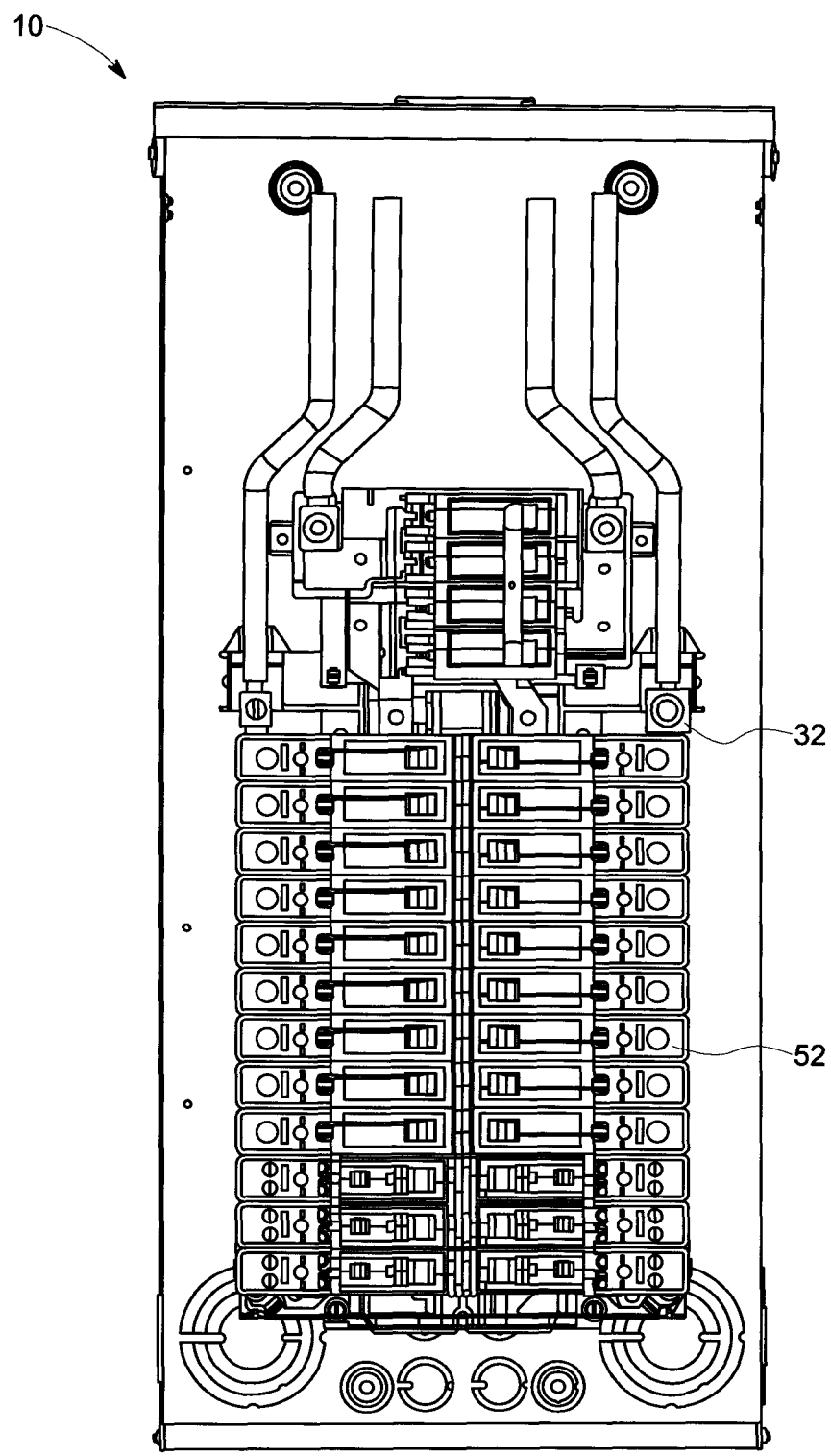
FIG. 3 illustrates a front view of an electrical distribution center having exemplary communications and processing modules coupled to circuit breakers.
Figure 4:
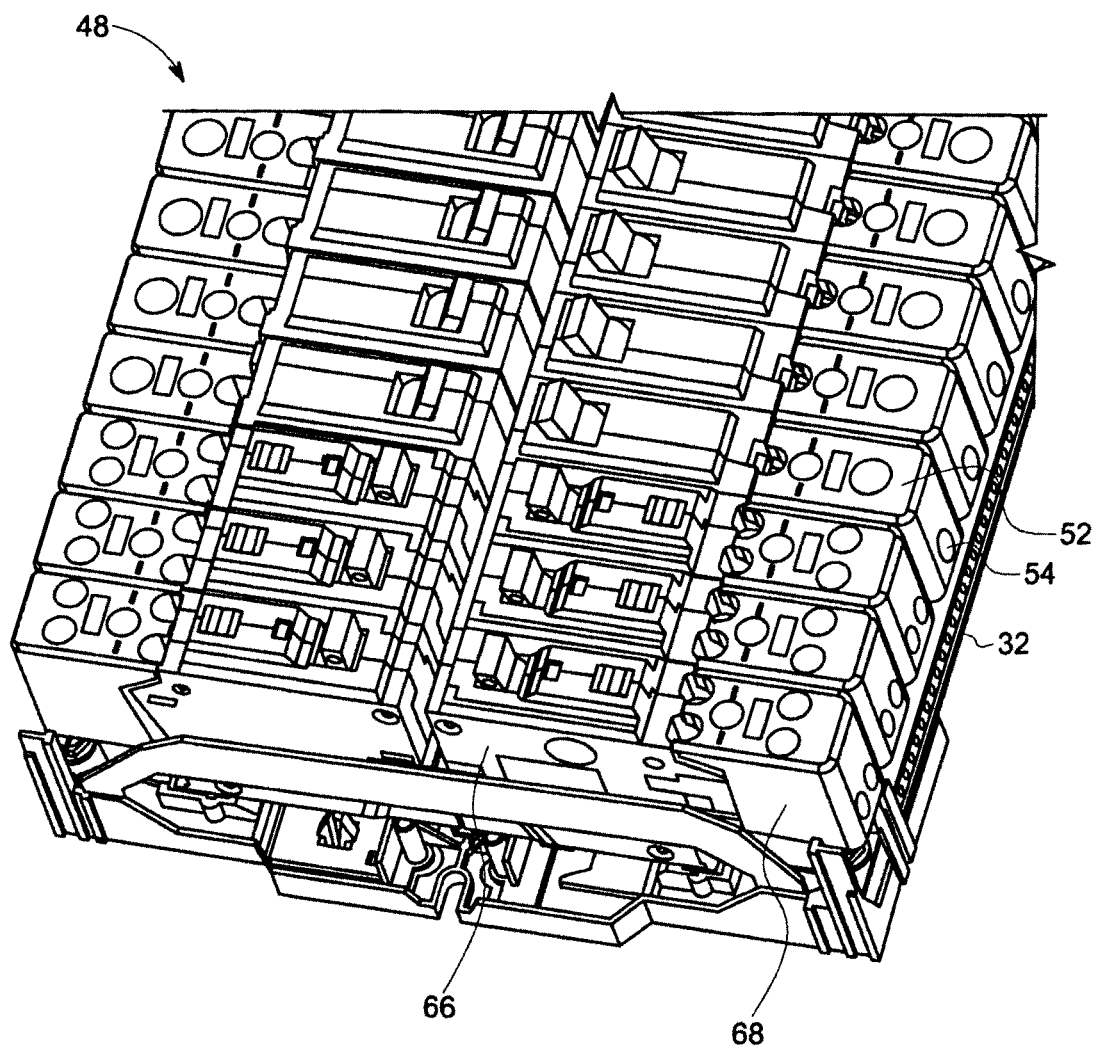
FIG. 4 illustrates a partial, close up, isometric view of the electrical distribution center of FIG. 3.

FIG. 3 illustrates a front view of electrical distribution center 10 having circuit breakers 28 and 30 coupled to exemplary communications and processing modules 48. FIG. 4 illustrates a partial, close up isometric view of electrical distribution center 10 having circuit breakers 28 and 30 coupled to exemplary communications and processing modules 48. Communications and processing modules 48 provide circuit breakers 28 and 30 with additional capabilities, such as monitoring and reporting capabilities. Further, communications and processing modules 48 do not interfere with the operation of circuit breakers 28 to 30 or electrical distribution center 10.

Figure 5:
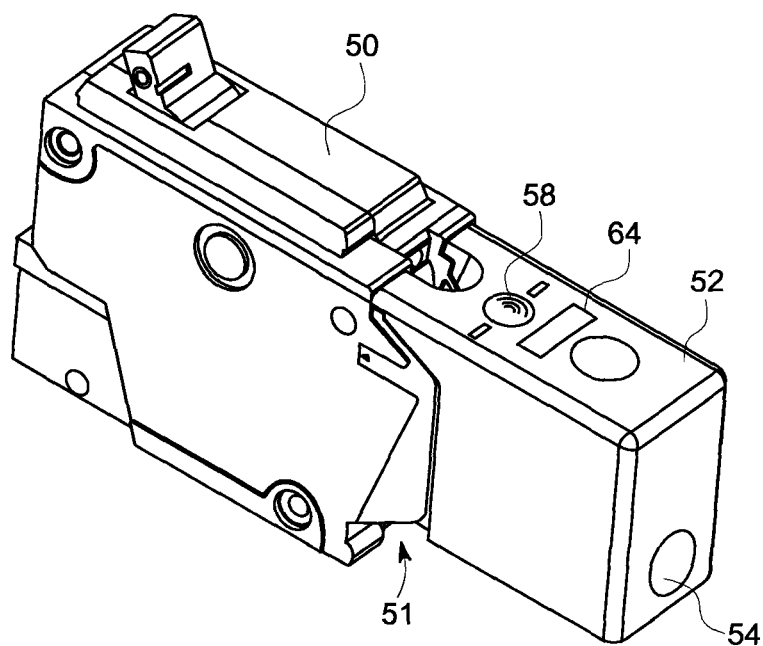
FIG. 5 illustrates an isometric view of a conventional circuit breaker and an exemplary communications and processing module.

FIG. 5 illustrates an isometric view of a circuit breaker 50 coupled to an exemplary communications and processing module 52. Circuit breaker 50 may be an overload circuit breaker operable to trip only when detecting excessive current. Referring to FIG. 5, communications and processing module 52 is coupled to a load lug side 51 of circuit breaker 50 in the exemplary embodiment. More specifically, communications and processing module 52 substantially covers a load lug (not shown) of circuit breaker 50. As used herein, a 'load lug' of a circuit breaker refers to an electrical output of the circuit breaker (i.e., an electrical contact coupleable to a load or other electrical device that receives current from the circuit breaker). This is in contrast to a line lug, which is an electrical input of the circuit breaker (i.e., an electrical contact coupleable to a power source or other electrical device that provides current to the circuit breaker).

In the exemplary embodiment, communications and processing module 52 incudes a housing 53 including at least one electrical contact that electrically couples to the load lug of the circuit breaker. For example, communications and processing module 52 may have a conductive spring or conductive pin that directly contacts the load lug, making an electrical connection. In the exemplary embodiment, communications and processing module 52 extends from between load lug side 51 of circuit breaker 50 to first neutral bus 32. In some embodiments, communications and processing module 52 is physically coupled to circuit breaker 50 to facilitate maintaining a position of communications and processing module 52.

Communications and processing module 52 includes an output lug 54 disposed within housing 53, and defines an electrical path between the load lug of circuit breaker 50 and output lug 54. Output lug 54 is an electrical output of communications and processing module 52 (i.e., an electrical contact coupleable to a load or other electrical device that receives current from communications and processing module 52). Communications and processing module 52 further contains sensors positioned in housing 53 as known in the art to sense operating conditions of the electrical path. For example, communications and processing module 52 may include sensors operable to measure voltage, current, power, frequency, energy usage, waveform data, temperature, etc.

In the exemplary embodiment, communications and processing module 52 records data representing at least one sensed condition that is measured by the sensors. That data may be recorded, for example, on a removable memory device. In some embodiments, communications and processing module 52 includes a communications interface (described in detail in connection with various embodiments herein) within housing 53 and operable to export data representing the sensed conditions to a remote computing device over a wired and/or wireless communications channel. To operate, communications and processing module 52 may, for example, draw power using the current flowing through the electrical path defined by communications and processing module 52. This power may be used to charge a power source, such as a battery, such that communications and processing module 52 will remain operable when no current flows through the electrical path. For example, in one embodiment, communications and processing module 52 includes a wireless inductive charger that charges a battery within communications and processing module 52.

Figure 6:
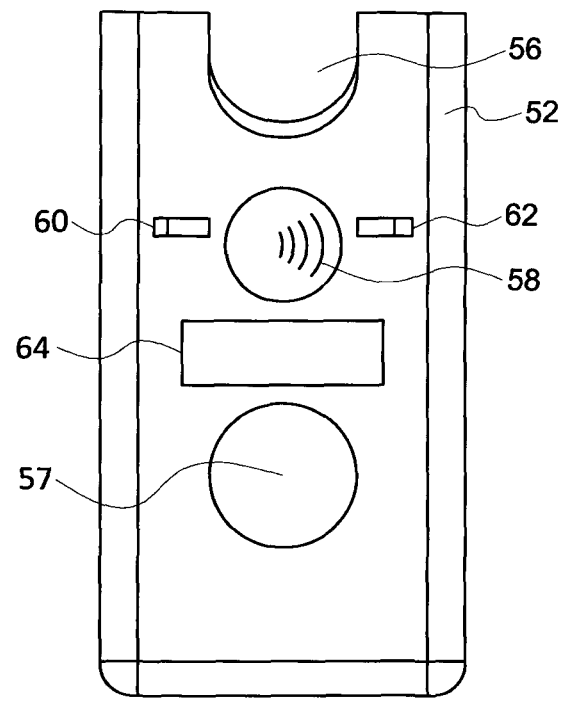
FIG. 6 illustrates a top view of the exemplary communications and processing module of FIG. 5.

FIG. 6 illustrates a top view of exemplary communications and processing module 52 of FIG. 5. In this embodiment, communications and processing module 52 defines a first recess 56 that facilitates accessing the load lug of circuit breaker 50 when communications and processing module 52 is coupled to circuit breaker 40. Further, communications and processing module 52 defines a second recess 57 positioned over output lug 54 that enables access to output lug 54 (e.g., to couple output lug 54 to a current carrying line).

In this embodiment, communications and processing module 52 includes a wireless communications interface. Accordingly, as shown in FIGS. 5 and 6, communications and processing module 52 includes a wireless communications indicator 58 that indicates whether wireless communications are current enabled or disabled for communications and processing module 52. Communications and processing module 52 52 further includes a first indicator 60 that indicates whether a general overload condition has occurred, and a second indicator 62 that indicates whether instantaneous trip condition has occurred. In addition to indicators 60, 62, communications and processing 52 may have a display 64 (e.g., an LCD display). Display 64 may dynamically display information relevant to the status of communications and processing module 52 (e.g., current through communications and processing module 52, voltage across communications and processing module 52, etc.). That is, display 64 may display up-to-date information relevant to the status of communications and processing module 52 in substantially real-time.

Figure 7:
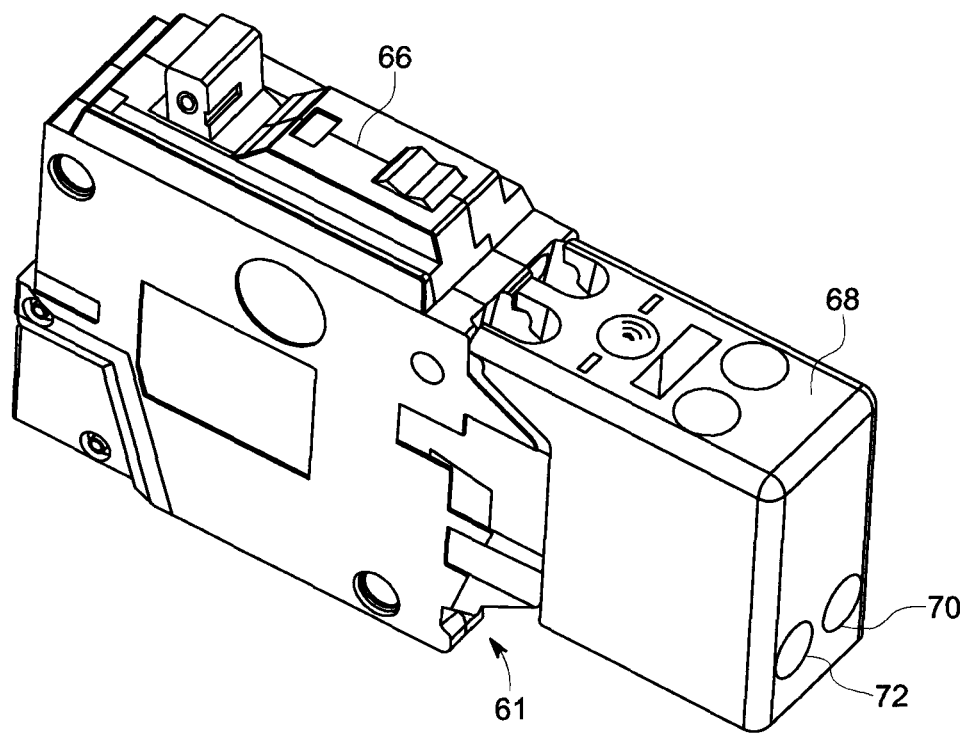
FIG. 7 illustrates an isometric view of a conventional circuit breaker and an exemplary communications and processing module.
Figure 8:
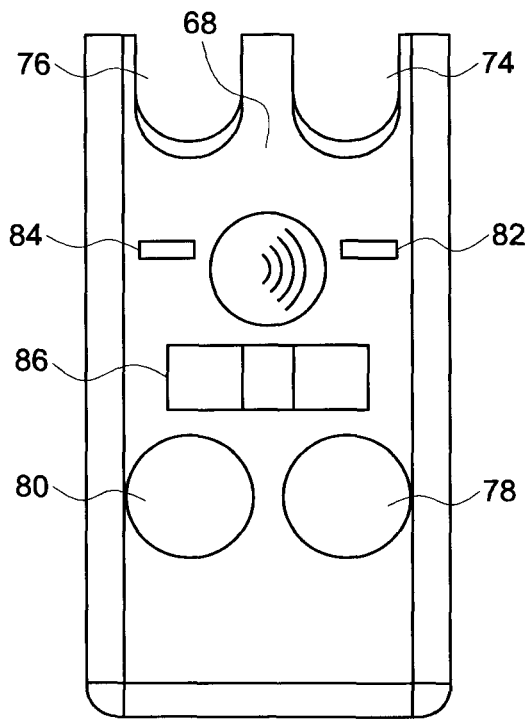
FIG. 8 illustrates a top view of the exemplary communications and processing module of FIG. 5.

Returning to FIG. 4, electrical distribution center 10 may include an advanced circuit breaker 66, such as a GFCI, AFCI, or other circuit breaker. FIG. 7 illustrates a perspective view of an exemplary communications and processing module 68 coupled to an advanced circuit breaker 66. FIG. 8 illustrates a top view of exemplary communications and processing module 68. As used herein, an 'advanced' circuit breaker refers to a circuit breaker capable of monitoring both a current carrying line and a neutral line to detect operating conditions. For example, advanced circuit breaker 66 may monitor differences in current between a current carrying line and a neutral line, or detect a certain frequency indicating a possible arc fault. In the exemplary embodiment, advanced circuit breaker 66 is electrically coupled to an electrical bus, and includes a load lug, similar to circuit breaker 50 (shown in FIG. 5). However, in contrast to circuit breaker 50, advanced circuit breaker 66 additionally includes a neutral lead that is coupled to a neutral bus, and a neutral load lug.

Referring to FIGS. 7 and FIG. 8, communications and processing module 68 couples to a lug side 61 of advanced circuit breaker 66. Communications and processing module 68 substantially covers the load lug (not shown) and the neutral load lug (not shown) of advanced circuit breaker 66 when coupled to advanced circuit breaker 66. Communications and processing module 68 includes a corresponding electrical contact for each lug of advanced circuit breaker 66 which electrically couples sensors within communications and processing module 68 to the lugs of advanced circuit breaker 66. Communications and processing module 68 extends from lug side 61 of advanced circuit breaker 66 to first neutral bus 32. Communications and processing module 68 may be physically coupled to advanced circuit breaker 66 to maintain a position of communications and processing module 68.

In the exemplary embodiment, communications and processing module 68 defines a first electrical path between the load lug of advanced circuit breaker 66 and an output lug 70 included on communications and processing module 68. Communications and processing module 68 further defines a second electrical path between the neutral load lug of advanced circuit breaker 66 and a neutral lug 72 on communications and processing module 68. Communications and processing module 68 includes sensors coupled to the first and second electrical paths to sense operating conditions. For example, communications and processing module 68 may have sensors operable to measure voltage, current, power, frequency, energy usage, waveform data, temperature, etc.

In the exemplary embodiment, communications and processing module 68 records data representing at least one sensed condition that is measured by the sensors. That data may be exported, for example, by recording that data to a removable memory device. In some embodiments, communications and processing module 68 includes a communications interface operable to export data representing the sensed conditions to an external device over a wired and/or wireless communications channel.

FIG. 8 illustrates a top view of exemplary communications and processing module 68 of FIG. 7. In this embodiment, communications and processing module 68 defines a first recess 74 that facilitates accessing the load lug of advanced circuit breaker 66 when communications and processing module 68 is coupled to advanced circuit breaker 66. Further, communications and processing module 52 defines a second recess 76 that facilitates accessing the neutral load lug of advanced circuit breaker 66. Communications and processing module 68 also defines a third recess 78 positioned over output lug 70 that enables accessing output lug 70 (e.g., to couple output lug 70 to a current carrying line), and a fourth recess 80 positioned over neutral lug 72 that facilitates access to neutral lug 72 (e.g., to couple neutral lug 72 to a neutral load line).

Communications and processing module 68 contains a wireless communications interface similar to that described in relation to communications and processing module 52 of FIG. 5 and FIG. 6. Communications and processing module 68 includes a first indicator 82 that indicates whether a ground fault tripping condition has occurred and a second indicator 84 that indicates whether an arc fault tripping condition has occurred. In addition to first and second indicators 82, 84, communications and processing module 68 may also include a display 86 (e.g., an LCD display). Display 86 may display information relevant to the status of communications and processing module 68 (e.g., current through communications and processing module 68, voltage across communications and processing module 68, etc.).

Figure 9:
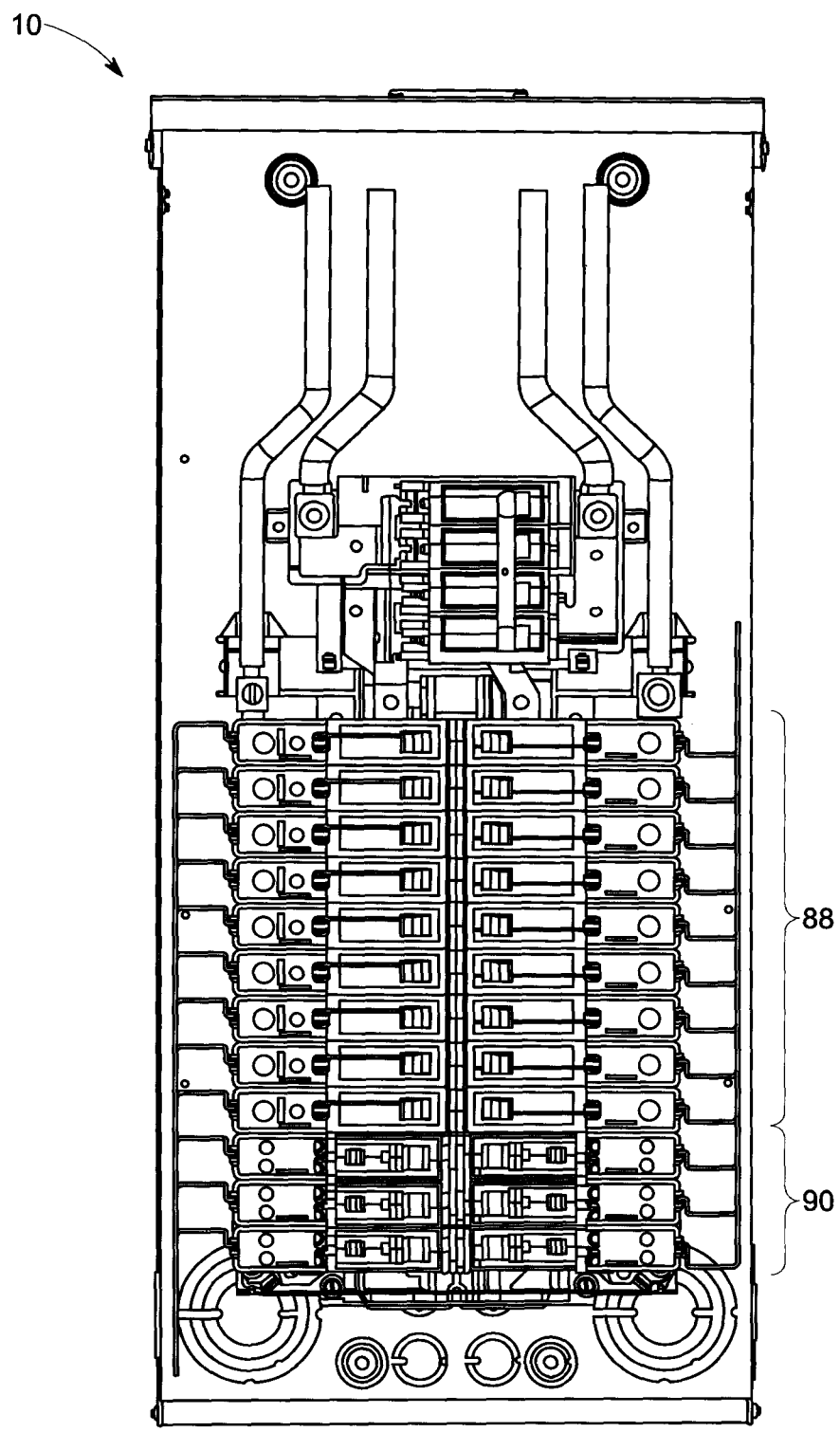
FIG. 9 illustrates a front view of an electrical distribution center having exemplary communications and processing modules coupled to circuit breakers.
Figure 10:
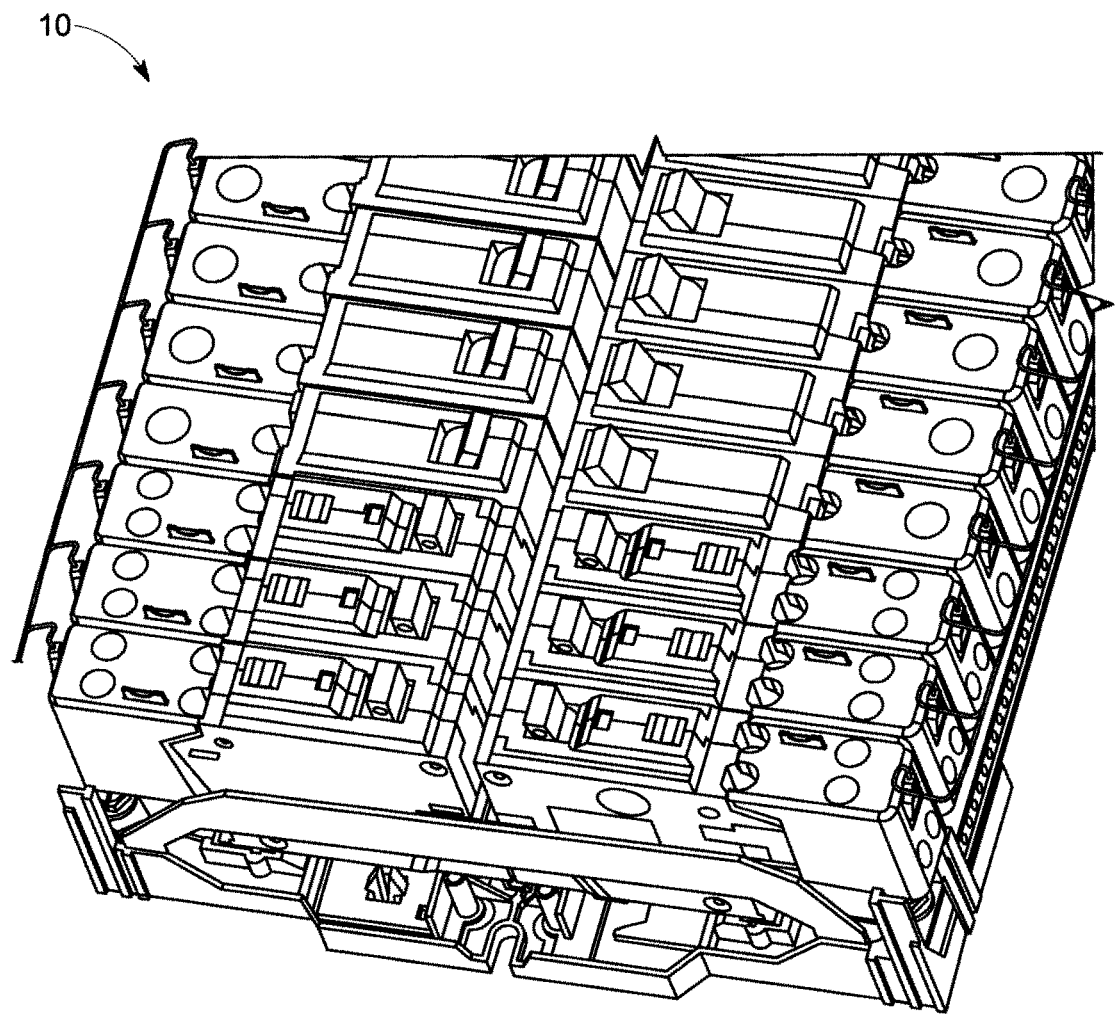
FIG. 10 illustrates a partial, close up, isometric view of the electrical distribution center of FIG. 9.

FIG. 9 illustrates a front view of electrical distribution center 10 of FIG. 1 including circuit breakers each coupled to exemplary communications and processing modules with wired communications interfaces. FIG. 10 illustrates a partial, close up isometric view of electrical distribution center 10 as shown in FIG. 9. Exemplary communications and processing modules do not interfere with the operation of circuit breakers or electrical distribution center 10.

Specifically, as shown in FIGS. 9 and 10, electrical distribution center 10 includes a plurality of circuit breakers 88 and a plurality of advanced circuit breakers 90. The operation of circuit breakers 88, 90 and the communications and processing modules is similar to that previously described in relation to FIG. 3 through FIG. 8, and will not be repeated except to note any differences between the embodiments.

Figure 11:
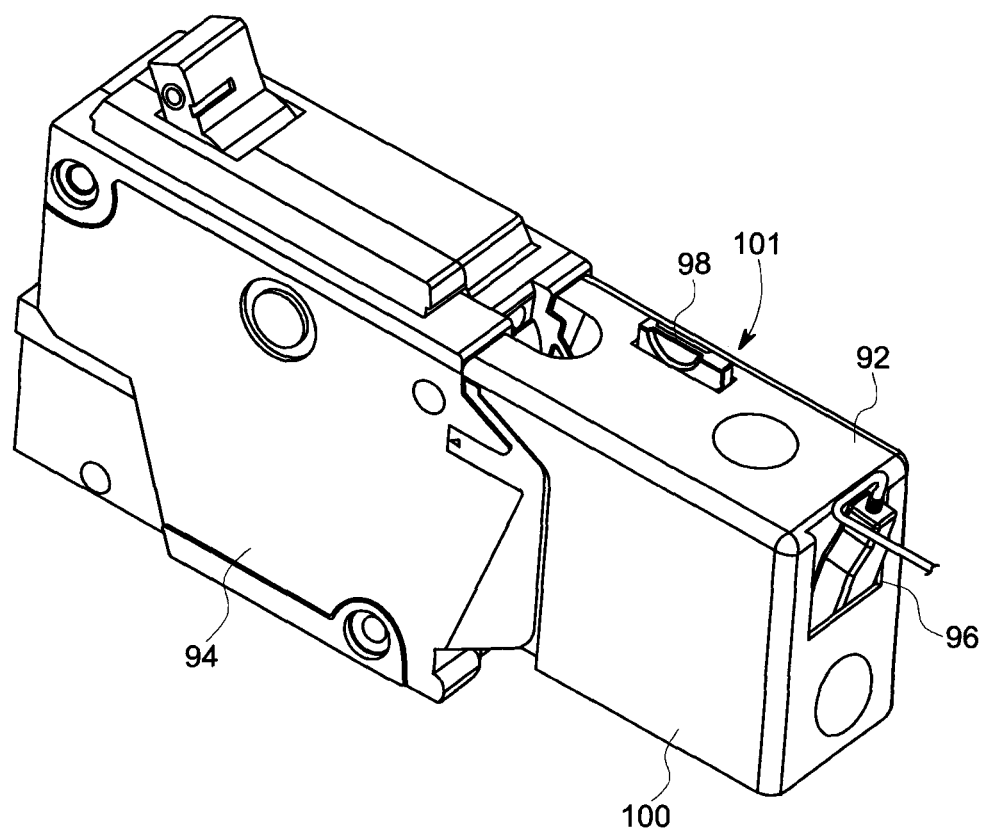
FIG. 11 illustrates an isometric view of a conventional circuit breaker and an exemplary communications and processing module.

FIG. 11 illustrates an exemplary communications and processing module 92 coupled to a circuit breaker 94. Communications and processing module 92 functions similar to communications and processing module 52, but includes a wired communications interface 96 instead of a wireless communications interface. Wired communications interface 96 is capable of transmitting data over a wired communications scheme to an external device. Additionally, communications and processing module 92 includes a communications interface capable of communicating with a removable storage device 98. More specifically, a body 100 of communications and processing module 92 defines a memory card interface 101 sized to receive removable storage device 98. Data may be stored directly to removable storage device 98 when storage device 98 engages memory card interface 101. Further, data may be exported to an external computing device using wired communications interface 96.

Figure 12:
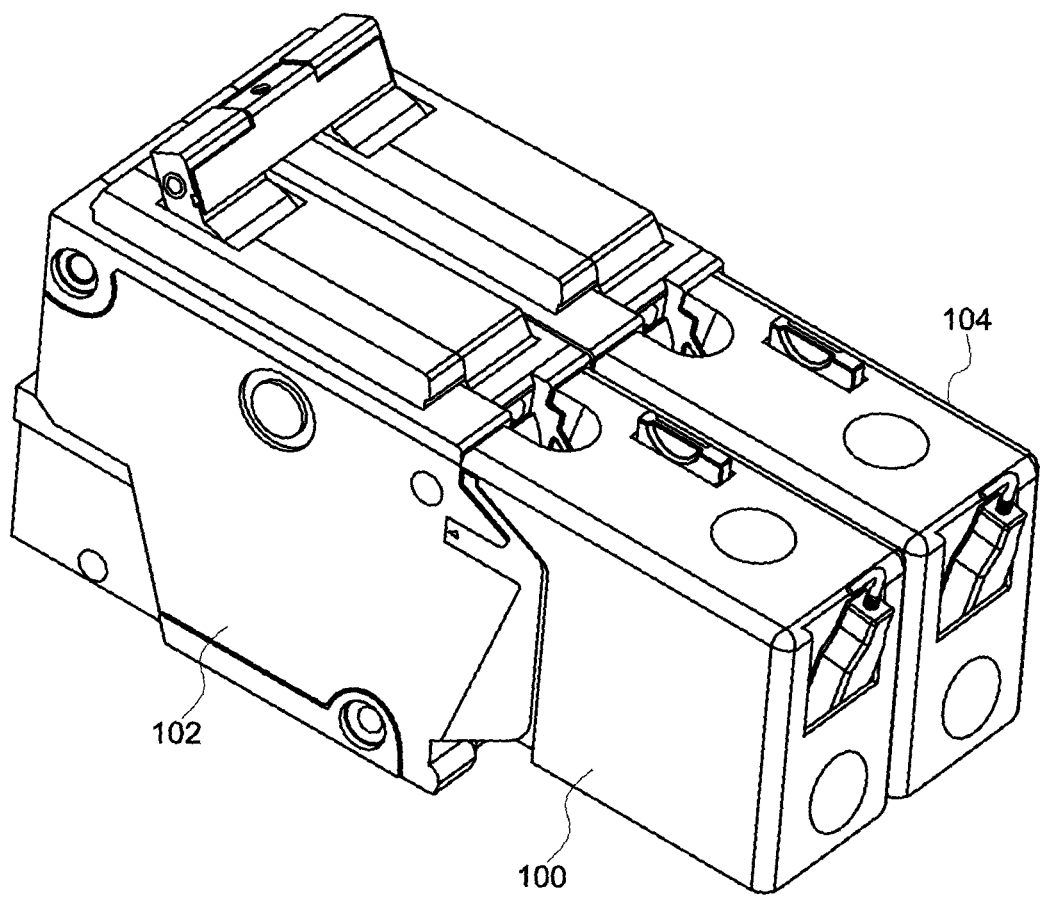
FIG. 12 illustrates an isometric view of a conventional circuit breaker and an exemplary communications and processing module.

FIG. 12 illustrates a double pole circuit breaker 102 having two lugs (not shown). Communications and processing module 92 and a second communications and processing module 104 are coupled to double pole circuit breaker 102 to monitor both poles of double pole circuit breaker 102. Communications and processing modules 92, 104 may be in communication with one another to monitor double pole circuit breaker 102, or may act independently of one another.

Figure 13:
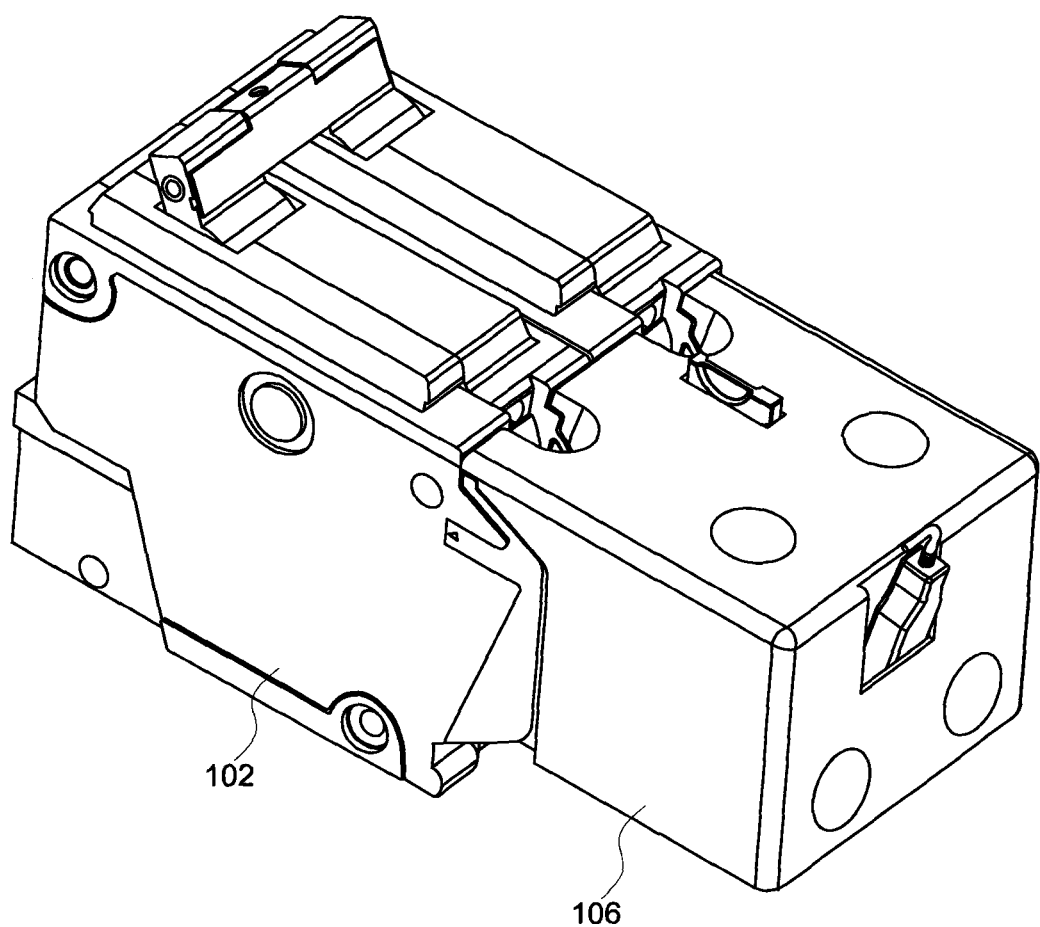
FIG. 13 illustrates an isometric view of a conventional circuit breaker and an exemplary communications and processing module.
Figure 14:
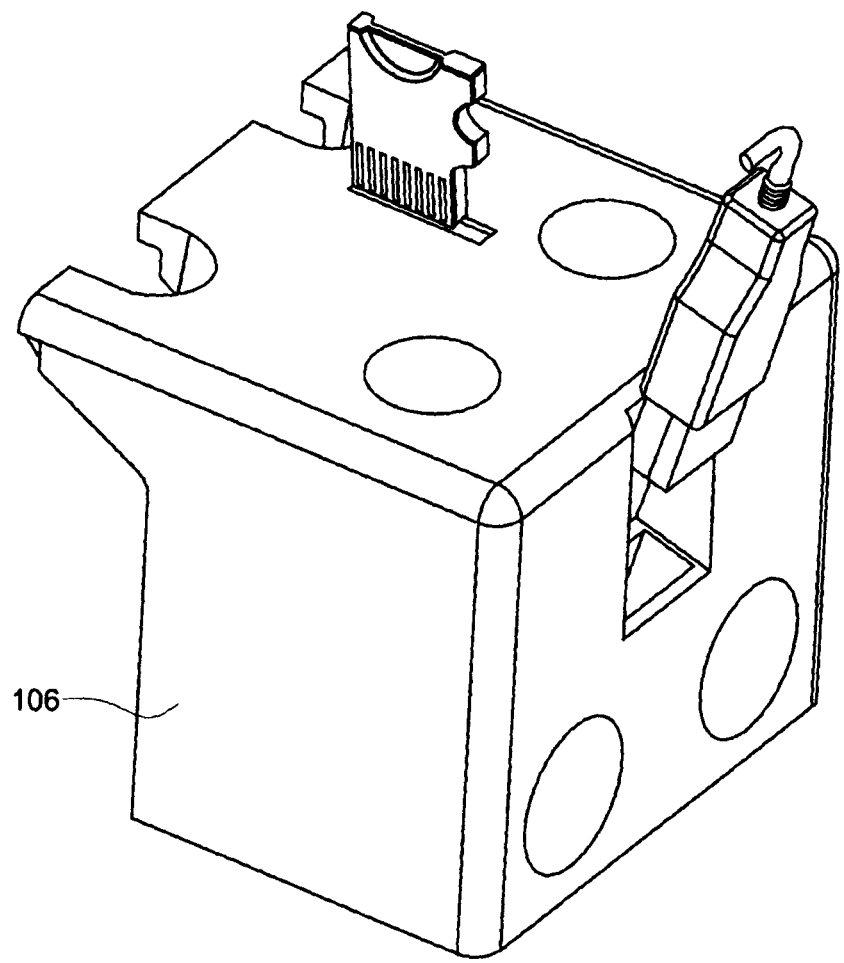
FIG. 14 illustrates an isometric view of the exemplary communications and processing module of FIG. 13.

FIG. 13 illustrates a perspective view of an exemplary wired communications and processing module 106 operable for wired communications and double pole circuit breaker 102. FIG. 14 illustrates a perspective view of w communications and processing module 106 of FIG. 13 without double pole circuit breaker 102. In contrast to communications and processing modules 92, 104, communications and processing module 106 is sized and shaped to span the width of two circuit breakers, or a single double pole circuit breaker, such as double pole circuit breaker 102. Thus, a single communications and processing module 106 may monitor both poles of double pole circuit breaker 102. Like communications and processing module 92, communications and processing module 106 has a wired communications interface and a slot configured to receive a removable memory device.

Figure 15:
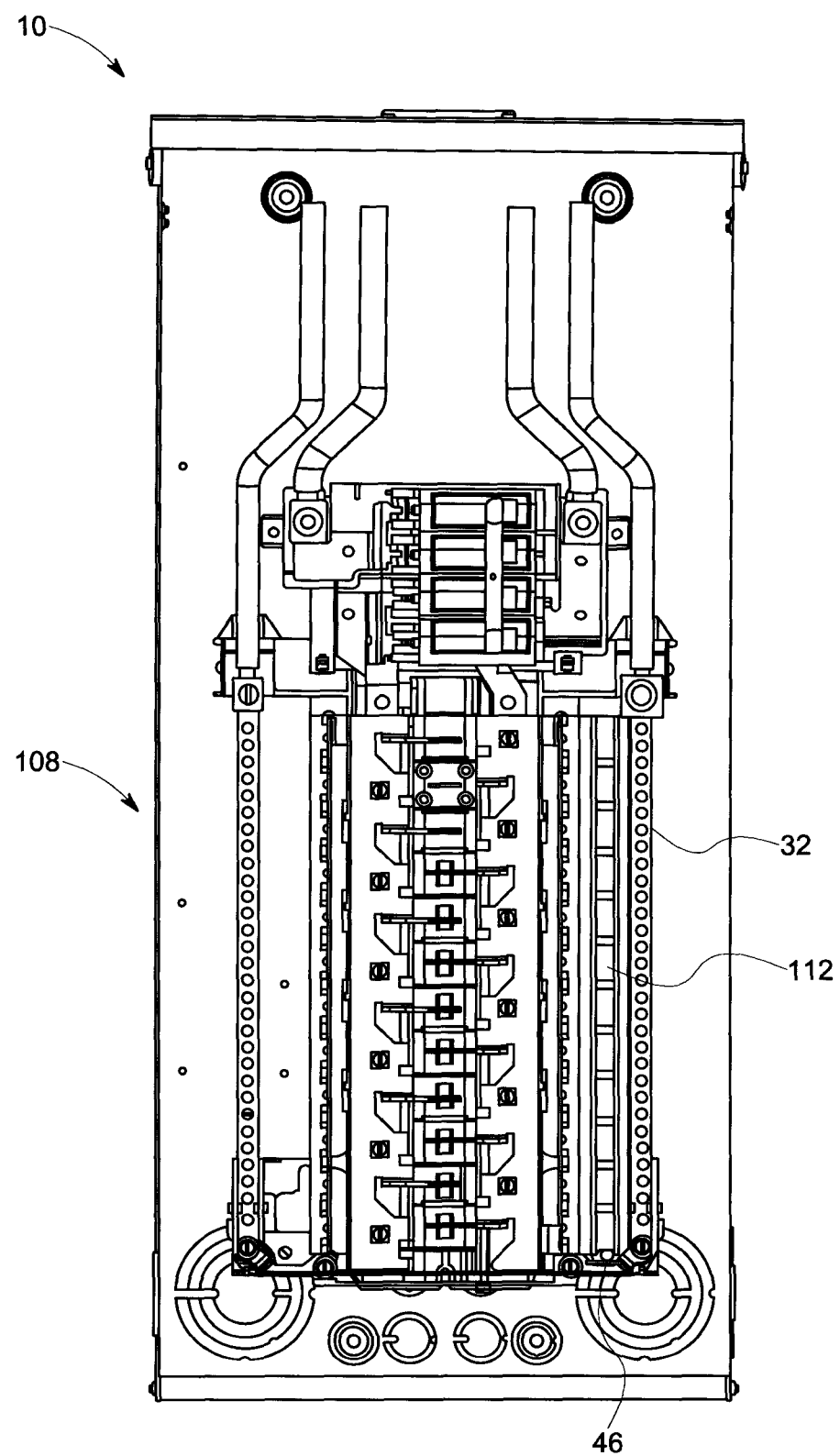
FIG. 15 illustrates a front view of an electrical distribution center having an exemplary mounting system for communications and processing modules.
Figure 16:
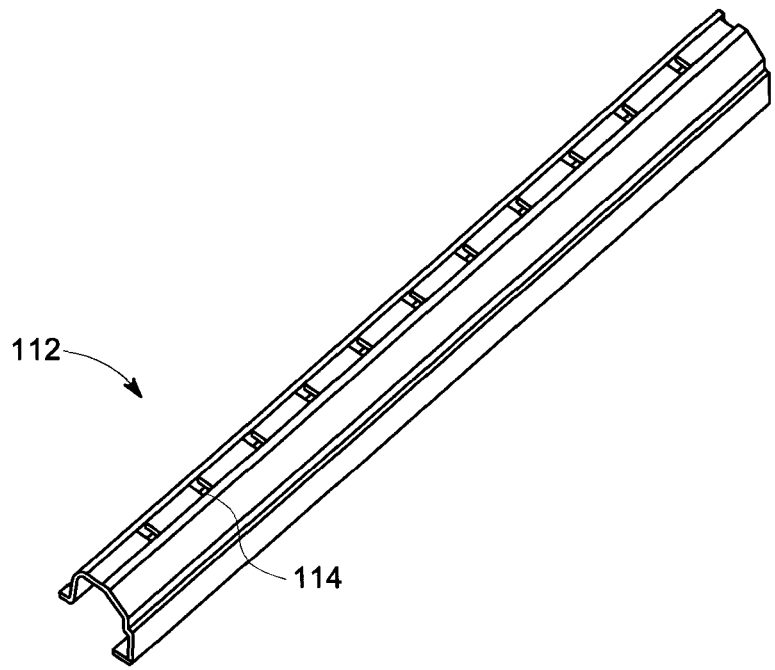
FIG. 16 illustrates an isometric view of an exemplary mounting rail.
Figure 17:
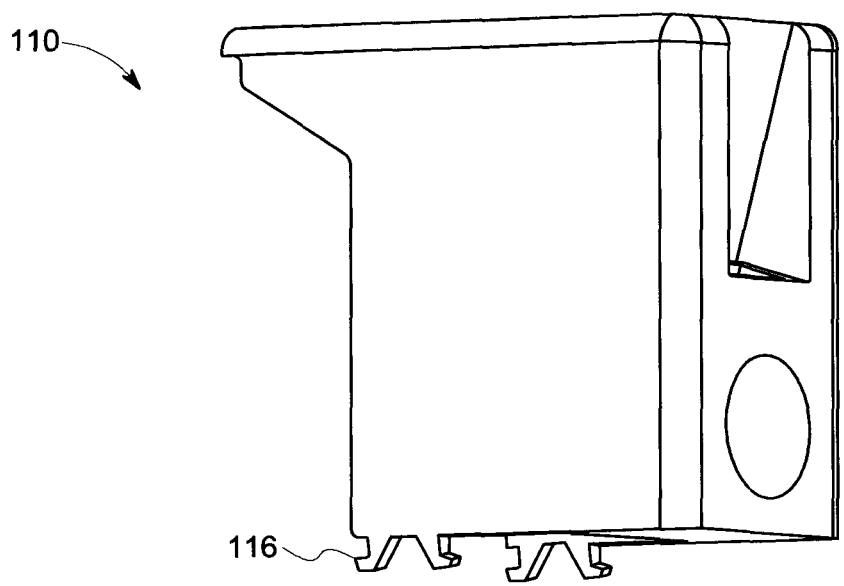
FIG. 17 illustrates an isometric view of an exemplary communications and processing module.
Figure 18:
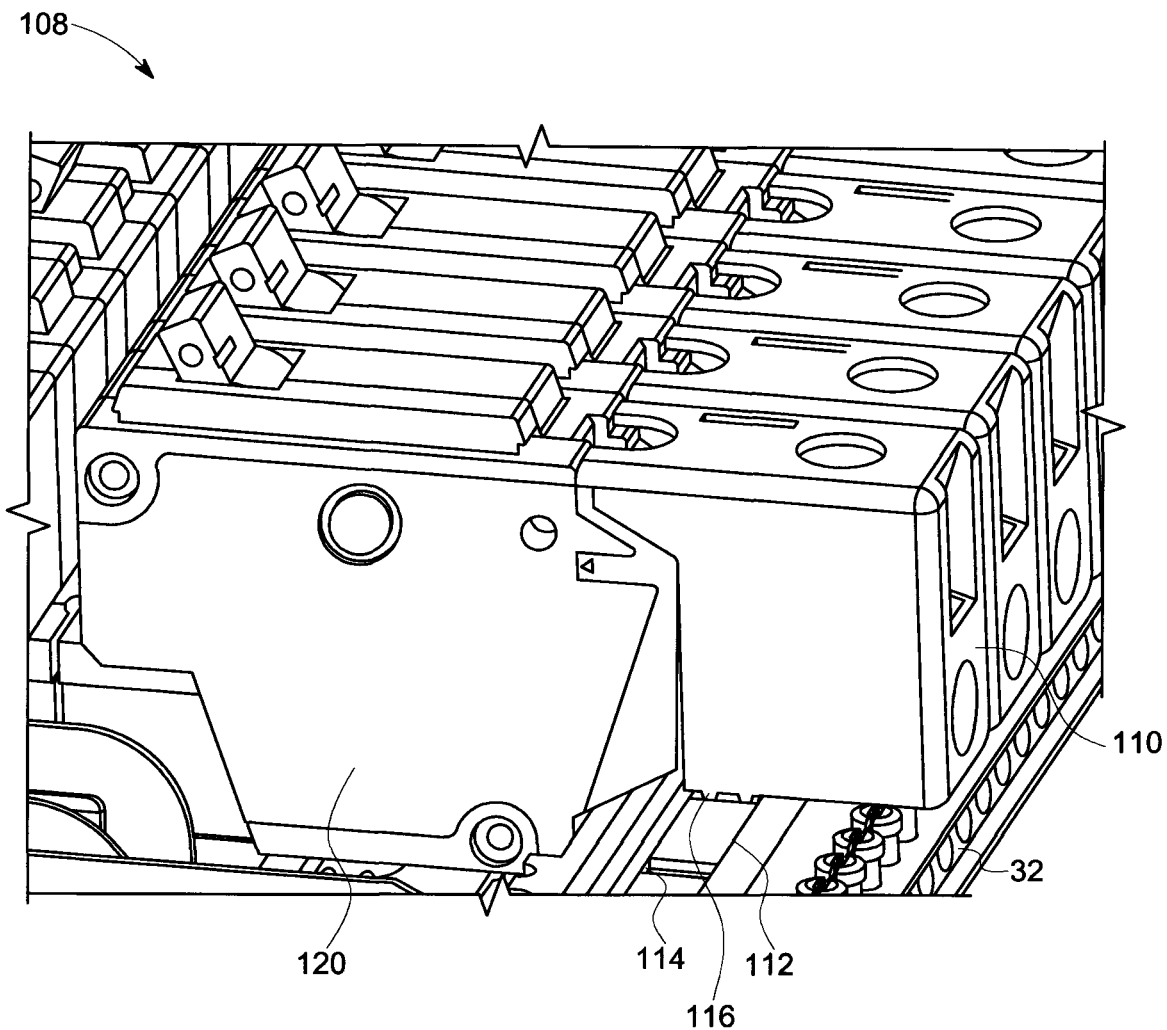
FIG. 18 illustrates a partial, close up, isometric view of an electrical distribution center.

FIG. 15 illustrates a front view of an exemplary mounting system 108 for coupling a plurality of communications and processing modules 110 (shown in FIG. 17) to electrical distribution center 10. FIG. 16 illustrates a perspective view of an exemplary mounting rail 112 that may be used in mounting system 108, and FIG. 17 illustrates an exemplary communications and processing module 110 for use in mounting system 108. FIG. 18 illustrates a close up, perspective view of communications and processing module 110 mounted to mounting rail 112 of mounting system 108.

In the exemplary embodiment, mounting rail 112 defines a plurality of slots 114 sized and oriented to receive corresponding tabs 116 of communications and processing module 110. Further, mounting rail 112 is positioned in gutter 46 and runs generally parallel to first neutral bus 32. In the exemplary embodiment, mounting rail 112 is nonconductive. Mounting rail 112 may be secured within gutter 46 by adhesives, fasteners, locking tabs, and/or other means.

Each slot 114 is sized and shaped to engage a corresponding tab 116 (e.g., in a snap fit configuration). Further, mounting rail 112 is positioned such that as tabs 116 of communications and processing module 110 engage slots 114, communications and processing module 110 electrically couples to circuit breaker 118. Further, with tabs 116 engaging slots 114, communications and processing module 110 is secured to electrical distribution center 10.

Figure 19:
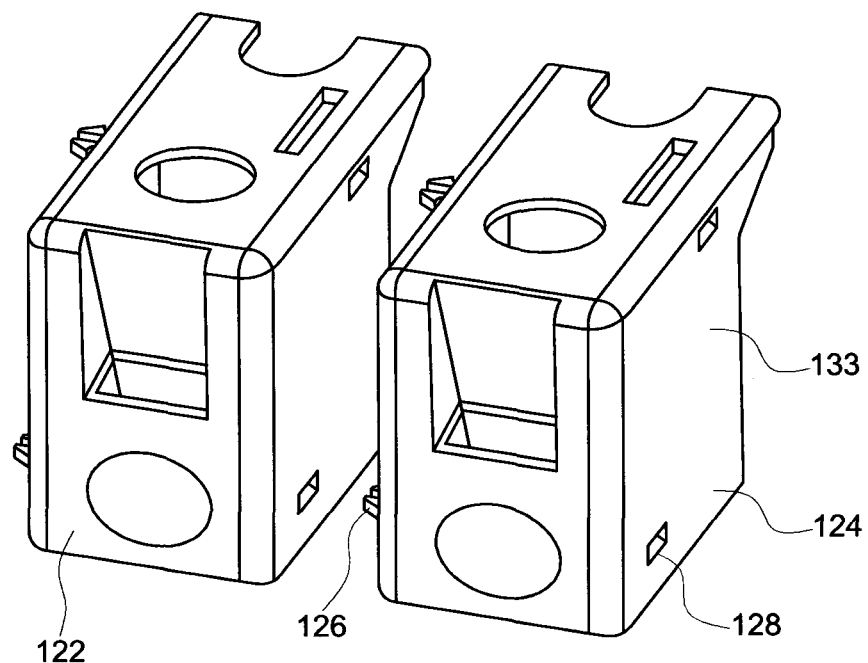
FIG. 19 illustrates an isometric view of two exemplary communications and processing modules.
Figure 20:
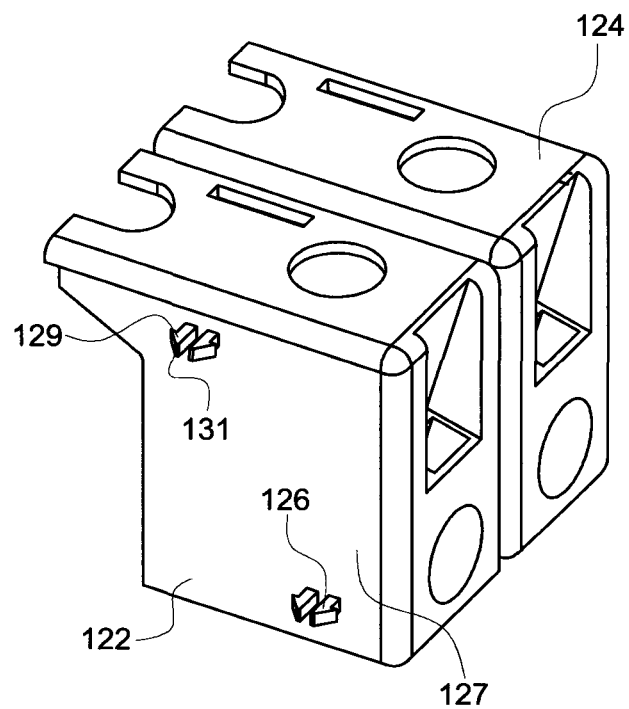
FIG. 20 illustrates an isometric view of the two exemplary communications and processing modules of FIG. 19.

In addition to mounting to a circuit breaker and/or a mounting rail, communications and processing modules may be physically coupled to adjacent communications and processing modules using at least one engagement feature. For example, FIG. 19 illustrates a perspective view of an exemplary first communications and processing module 122 and an exemplary second communications and processing module 124 adapted to be coupled to one another. FIG. 20 illustrates a perspective view of the exemplary first and second communications and processing modules 122 and 124 coupled to one another.

First and second communications and processing modules 122 and 124 may be, for example, any of the communications and processing modules described previously. In the exemplary embodiment, first and second communications and processing modules 122 and 124 each include at least one post 126 (extending laterally from a first side 127 of the associated module. In the exemplary embodiment, each post 126 includes a shaft 129 that extends from first side 127 to a prong 131 at a distal end of post 126. A second side 133 of each of first and second communications and processing modules 122 and 124 defines an aperture 128 configured to engage post 126.

Accordingly, in the exemplary embodiment, to couple first communications and processing module 122 to second communications and processing module 124, posts 126 on second communications and processing module 124 engage corresponding apertures 128 on first communications and processing module 122 (e.g., in a snap fit engagement). Other communications and processing modules may then be coupled to first communications and processing module 122 and second communications and processing module 124 in a similar fashion.

Figure 21:
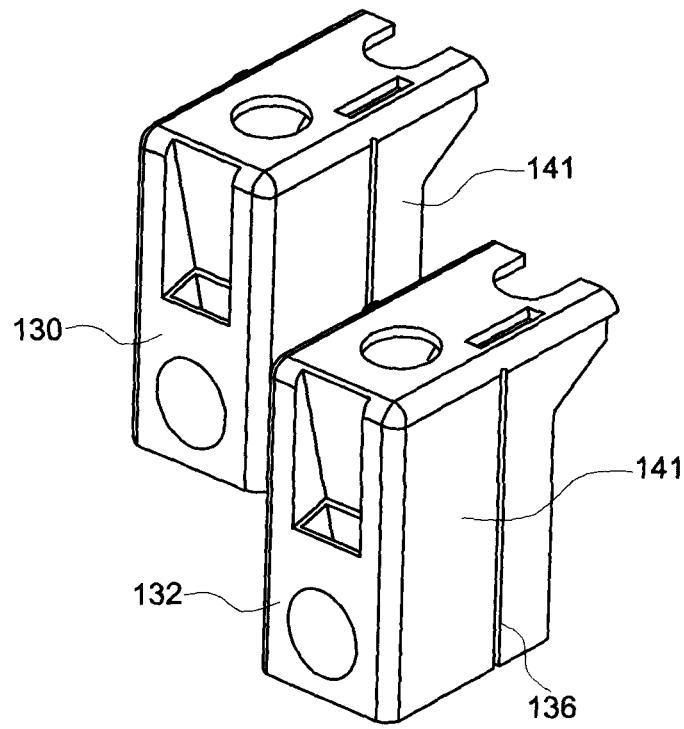
FIG. 21 illustrates an isometric view of two exemplary communications and processing modules.
Figure 22:
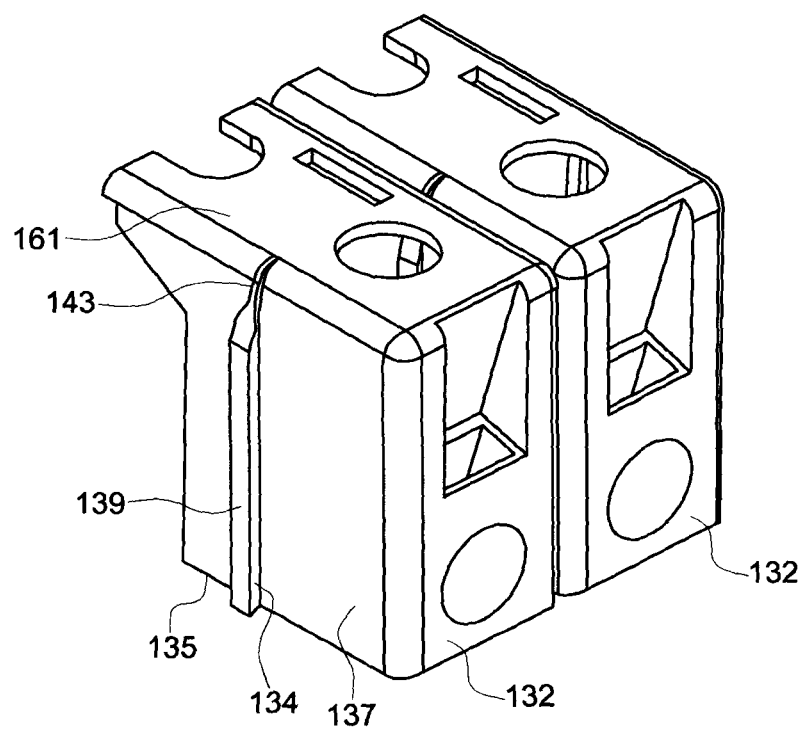
FIG. 22 illustrates an isometric view of the two exemplary communications and processing modules of FIG. 21.

FIG. 21 illustrates a perspective view of an exemplary first communications and processing module 130 and an exemplary second communications and processing module 132 adapted to be coupled to one another using an alternative engagement feature. FIG. 22 illustrates a perspective view of the exemplary first and second communications and processing modules 130 and 132 coupled to one another.

First and second communications and processing modules 130 and 132 may be, for example, any of the communications and processing modules described previously. In the exemplary embodiment, first and second communications and processing modules 130 and 132 each include at least one rail 134 extending along a first side 137 of the associated module. Specifically, rail 134 extends from a base 135 to a top 161 of the associated module. Rail 134 includes a first portion 143 and a second portion 139, first portion 143 having a reduced thickness relative to second portion 139. A second side 141 opposite first side 137 defines at least one slot 136 sized and oriented to engage a corresponding rail 134.

Accordingly, in the exemplary embodiment, to couple first and second communications and processing modules 130 and 132 together, rail 134 of second communications and processing module 132 engages slot 136 of first communications and processing module 130. Second portion 139 of rail 134 secures first communications and processing module 130 to second communications and processing module 132. Other communications and processing modules may then be coupled to first communications and processing module 130 and second communications and processing module 132 in a similar fashion. FIG. 22 illustrates first communications and processing module 130 and second communications and processing module 132 coupled together as described.

Figure 23:
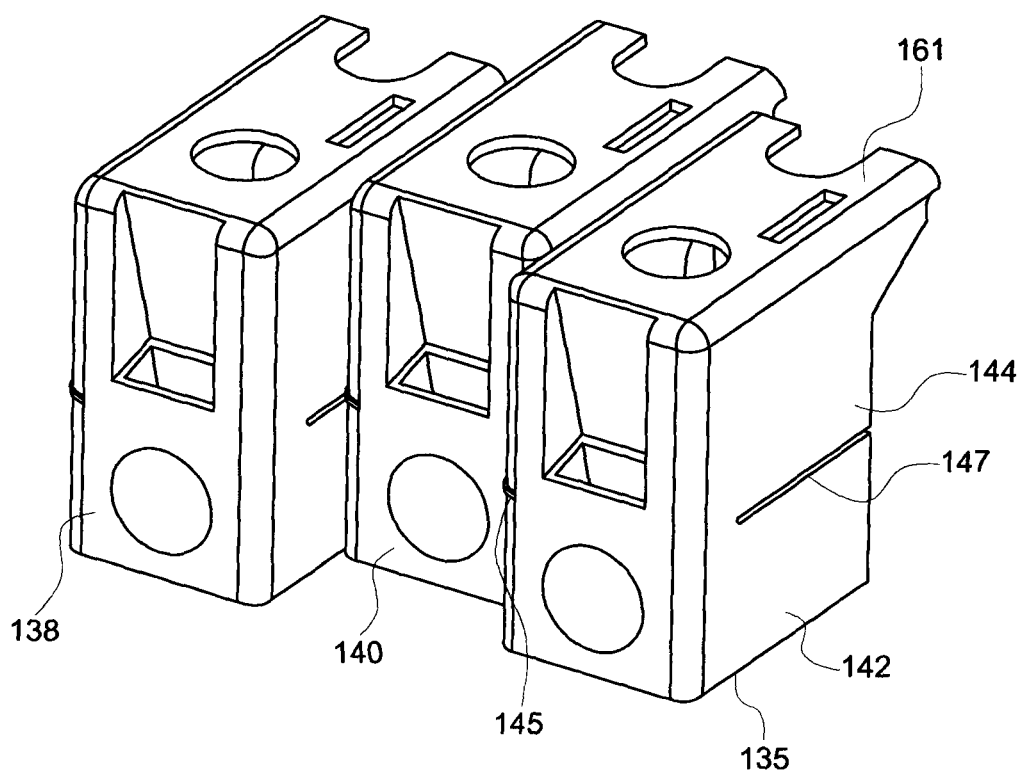
FIG. 23 illustrates an isometric view of three exemplary communications and processing modules.

FIG. 23 illustrates an isometric view of three exemplary communications and processing modules 138, 140, 142 being coupled together using an alternative engagement feature. Communications and processing modules 138, 140, 142 are coupled together in a manner similar to first and second communications and processing modules 130 and 132 of FIG. 21 and FIG. 22. However, in this embodiment, a rail 145 and a corresponding slot 147 are oriented substantially orthogonal to rail 134 and slot 136. That is, in this embodiment, rail 145 and slot 147 do not extend between base 135 and top 161, but extend in a direction substantially orthogonal to direction defined from base 135 towards top 161.

Figure 24:
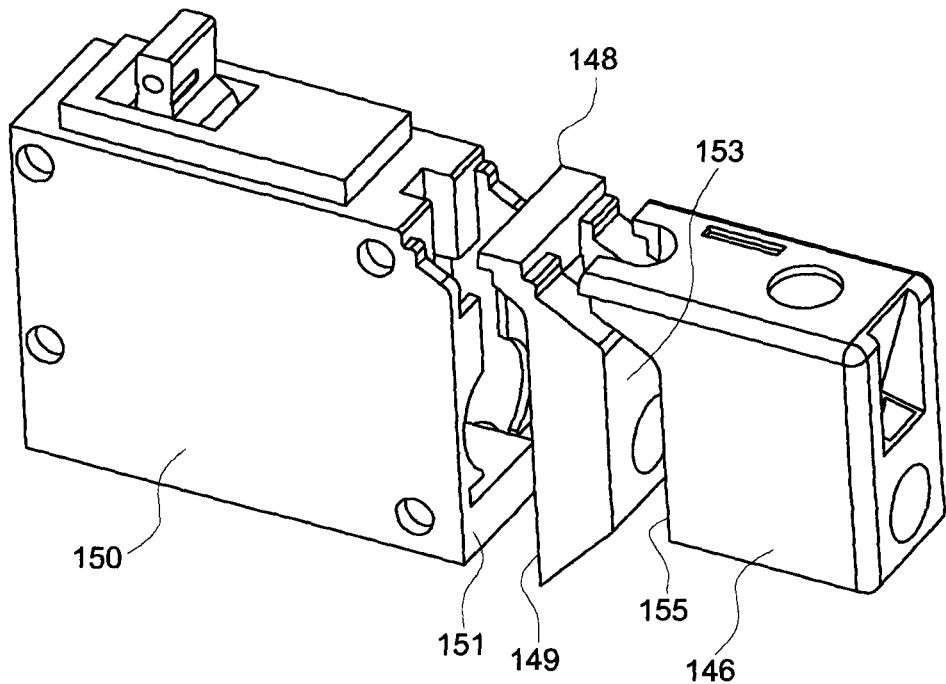
FIG. 24 illustrates an isometric view of a communications and processing module, an adapter, and a circuit breaker.

FIG. 24 illustrates an isometric view of an exemplary communications and processing module 146 being coupled to a circuit breaker 150 using an exemplary adapter 148. Exemplary communications and processing module 146 may be any of the previously described communications and processing modules. Adapter 148 enables communications and processing module 146 to be coupled to a first type of circuit breaker (e.g., circuit breaker 150) when communications and processing module 146 is designed to be directly coupled to a second, different type of circuit breaker.

Figure 25:
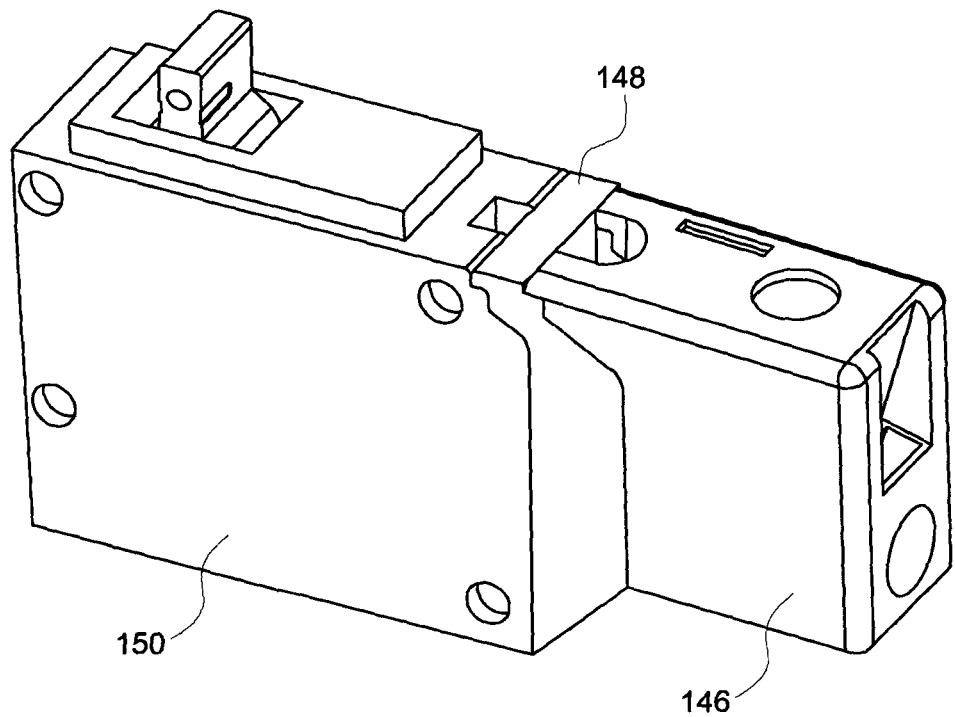
FIG. 25 illustrates an isometric view of a FIG. 21 illustrates an isometric view of a communications and processing module joined to a circuit breaker using an adapter.

Adapter 148 includes a first surface 149 that is shaped complementary to a load lug end 151 of circuit breaker 150. Further, adapter 148 includes a second surface 153 opposite first surface 149. Second surface 153 is shaped complementary to an interface surface 155 of communications and processing module 146. Adapter 148 electrically couples to a load lug of circuit breaker 150 and provides an electrical path between the load lug and an electrical contact of communications and processing module 146. In the exemplary embodiment, adapter 148 physically couples to both circuit breaker 150 and communications and processing module 146. FIG. 25 illustrates adapter 148 coupling circuit breaker 150 and communications and processing module 146 together. In some embodiments, the adapter 148 may be packaged in a kit with the communications and processing module 146.

Figure 26:
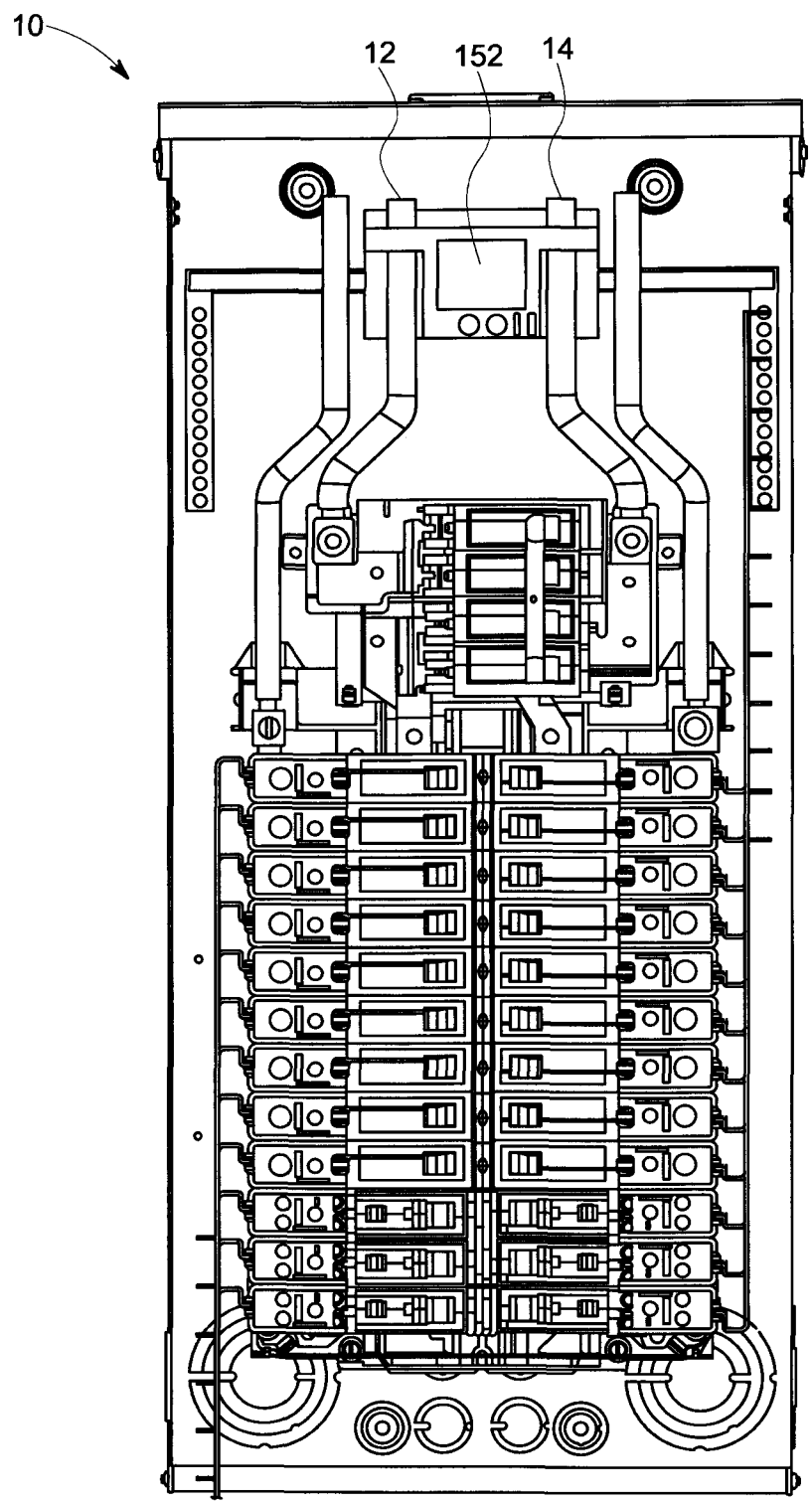
FIG. 26 illustrates a top view of an electrical distribution center.
Figure 27:
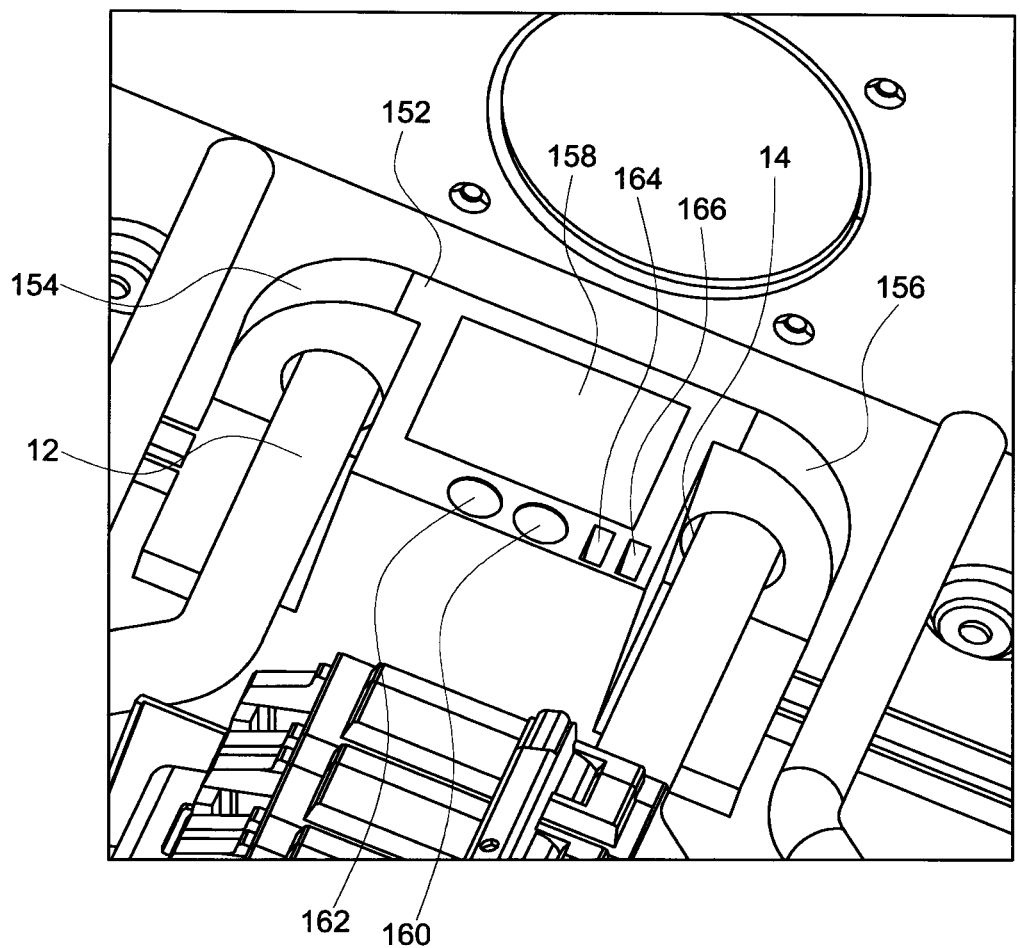
FIG. 27 illustrates a partial, close up, isometric view of the electrical distribution center of FIG. 26.

FIG. 26 illustrates electrical distribution center 10 including an exemplary communications and processing hub 152. FIG. 27 is a close up, partial view of electrical distribution center 10. In the exemplary embodiment, communications and processing hub 152 is located proximate first current carrying wire 12 and second current carrying wire 14. Communications and processing hub 152 may be secured, for example, to a back panel of electrical distribution center 10.

In the exemplary embodiment, communications and processing hub 152 includes a first sensor 154 and a second sensor 156 operable to sense operating conditions of first current carrying wire 12 and second current carrying wire 14, respectively. Sensors 154 and 156 may include, for example, an inductive sensor as known in the art. First sensor 154 and second sensor 156 are operably coupled to a microcontroller (not shown) in communications and processing hub 152, and the microcontroller records operating conditions sensed by first sensor 154 and second sensor 156.

Communications and processing hub 152 further includes a display 158 (e.g., and LCD display) that is communicatively coupled to the microcontroller. Display 158 may display troubleshooting information, fault data, and/or sensed operating conditions. In the exemplary embodiment, communications and processing hub 152 includes a first indicator 160 and a second indicator 162 operable to display an indication of various operating conditions. Further, communications and processing hub 152 includes a first communications port 164 and a second communications port 166 communicatively coupled to microcontroller. First communications port 164 and second communications port 166 provide an interface for communicating with an external device for storage and analysis of data representing sensed operating conditions. For example, at least one of first and second communications ports 164 and 166 may be a USB port.

Figure 28:
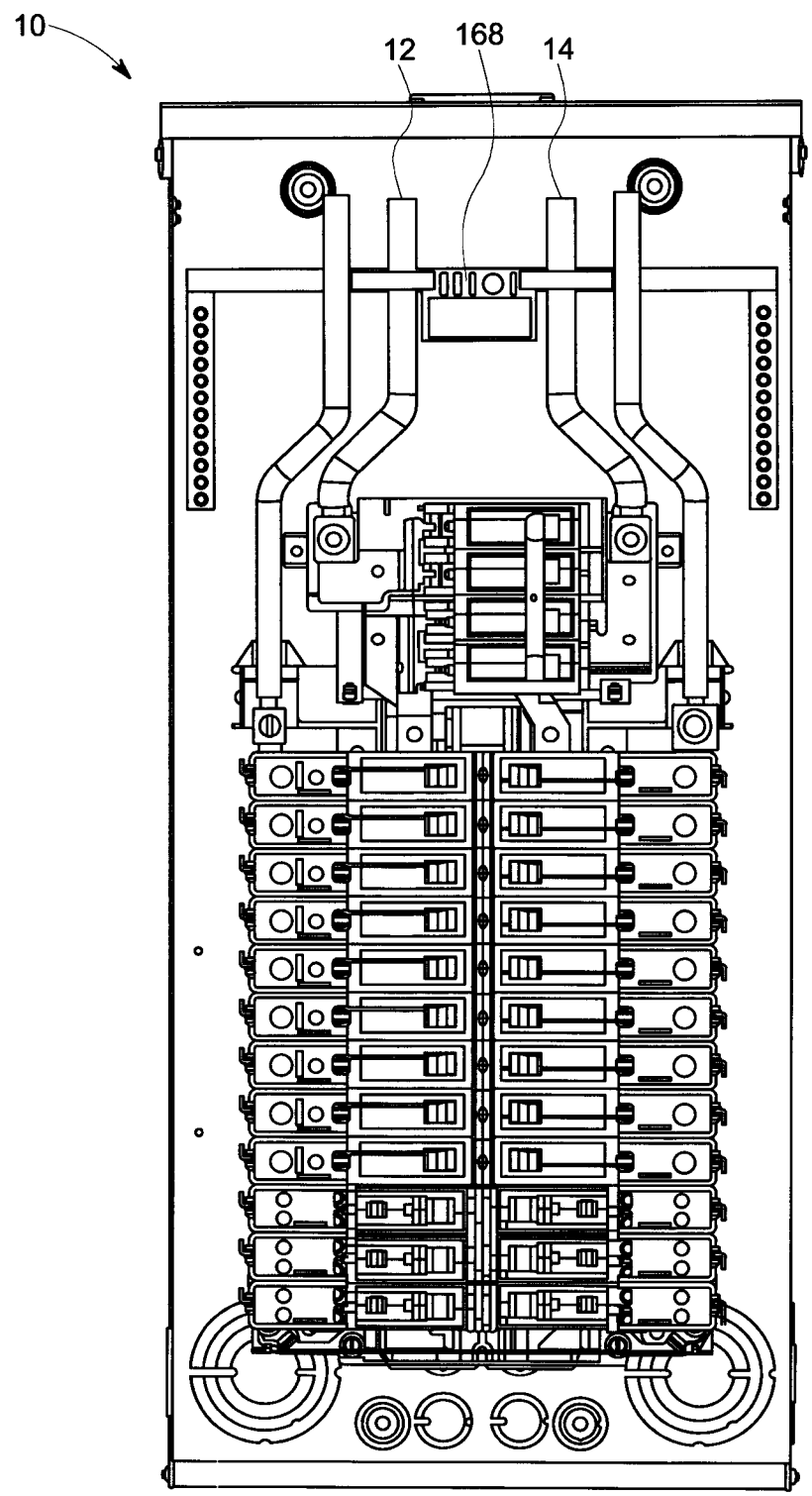
FIG. 28 illustrates a top view of an electrical distribution center.
Figure 29:
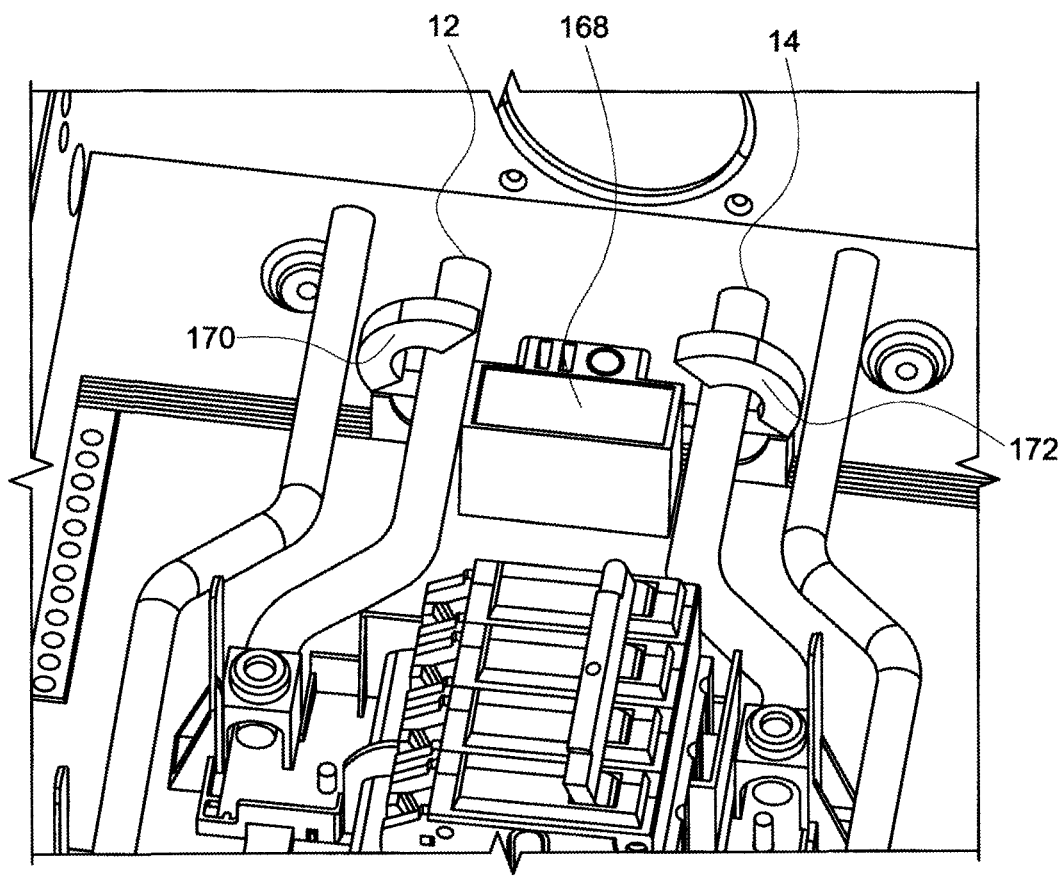
FIG. 29 illustrates a partial, close up, isometric view of the electrical distribution center of FIG. 28.
Figure 30:
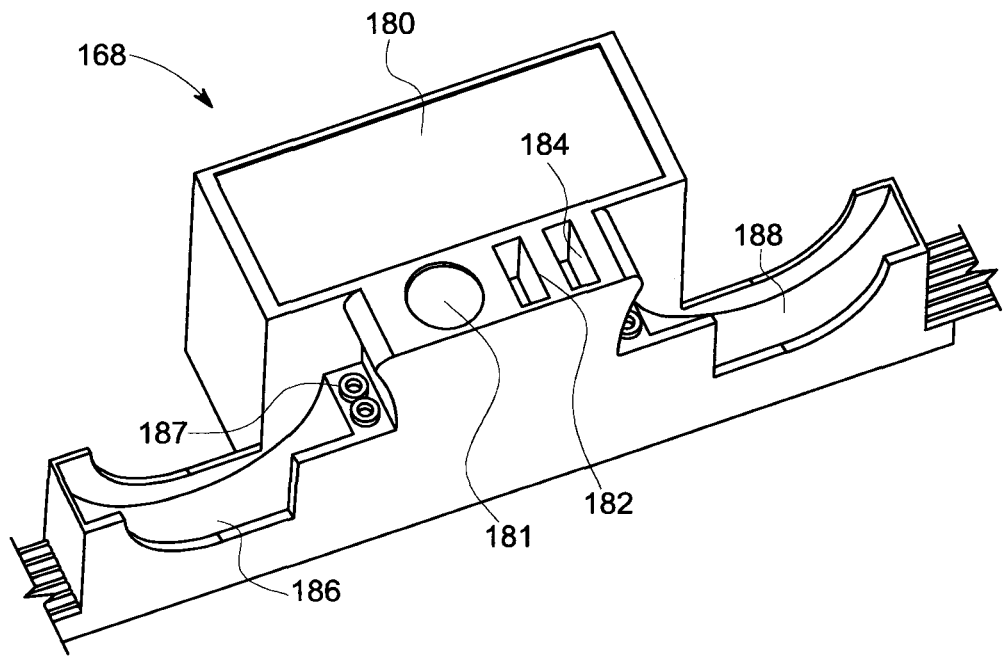
FIG. 30 illustrates an isometric view of an exemplary communications and processing hub.

FIG. 28 illustrates an electrical distribution center 10 including an alternative exemplary communications and processing hub 168. FIG. 29 is a close up, partial view of electrical distribution center 10. FIG. 30 illustrates a perspective view of exemplary communications and processing hub 168. Communications and processing hub 168 is similar to communications and processing hub 152, and includes a display 180, indicator 181, a first communications port 182, and a second communications port 184.

In this embodiment, communications and processing hub 168 include a first current transformer 170 operable to surround first current carrying wire, and a second current transformer 172 operable to surround second current carrying wire 14. First and second current transformers 170 and 172 facilitate measuring alternating current (AC) current through first and second current carrying wires 12 and 14, respectively. Specifically, first current transformer 170 and second current transformer 172 produce secondary currents proportional to currents in first current carrying wire 12 and second current carrying wire 14, respectively. The secondary currents may then be sensed by a sensor included in communications and processing hub 168. First current transformer 170 and second current transformer 172 may be positioned anywhere along first current carrying wire 12 and second current carrying wire 14.

Communications and processing hub 168 includes a first current transformer receiver 186 and a second current transformer receiver 188 sized and shaped to receive first current transformer 170 and second current transformer 172, respectively. First current transformer receiver 186 is positioned under first current carrying wire 12 and second current transformer receiver 188 is positioned under second current carrying wire 14. First and second current transformer receivers 186 and 188 each include a terminal 187 for connection to an associated current transformer. Terminal 187 may be, for example, a spring contact that makes an electrical connection with a contact of a current transformer placed in the associated current transformer receiver.

Figure 31:
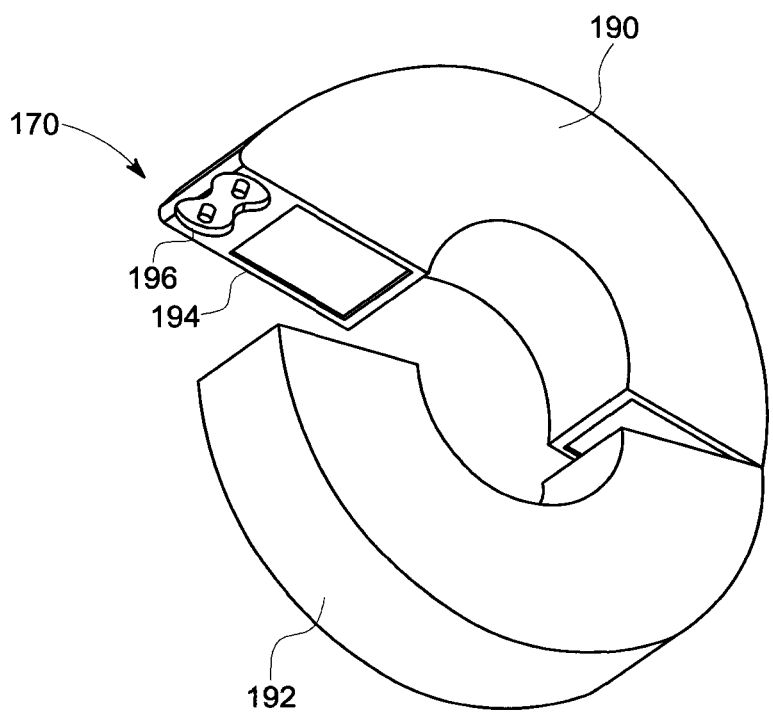
FIG. 31 illustrates an isometric view of an exemplary current transformer.

FIG. 31 illustrates first current transformer 170. In the exemplary embodiment, first current transformer 170 is generally ring shaped with an inner radius sized to surround an outer radius of a current carrying wire. First current transformer 170 includes a first half 190 and a second half 192 that may be separated from one another when positioning first current transformer 170 to surround the current carrying wire. In the exemplary embodiment, first half 190 includes a protrusion 194 having electrical contacts 196 in electrical communication with windings of first current transformer 170. When first current transformer 170 is placed in first current transformer receiver 186, electrical contacts 196 contact terminal 187.

Figure 32:
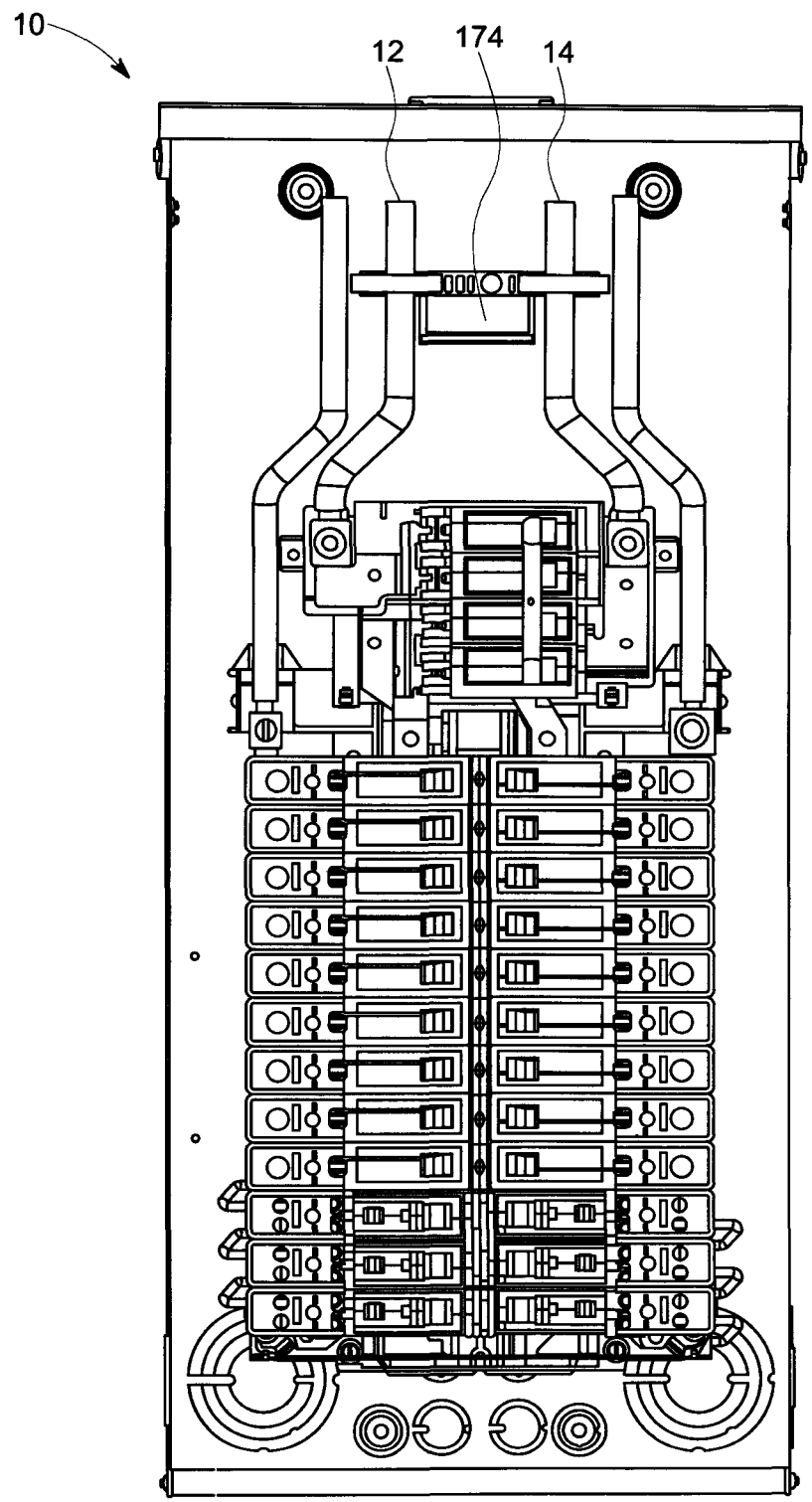
FIG. 32 illustrates a top view of an electrical distribution center.
Figure 33:
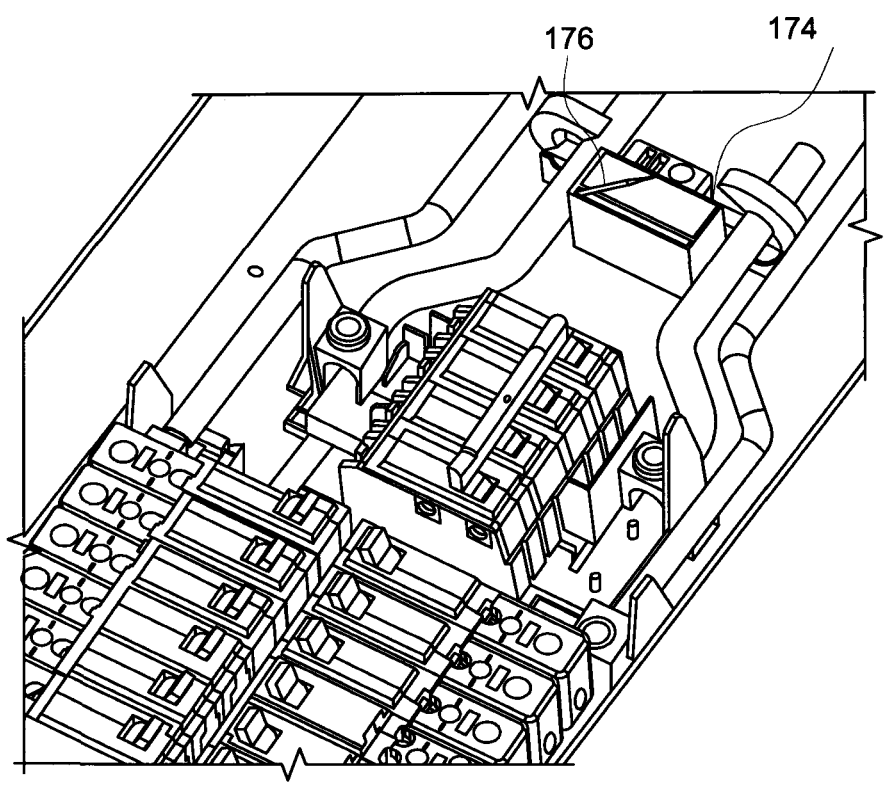
FIG. 33 illustrates a partial, close up, isometric view of the electrical distribution center of FIG. 32.
Figure 34:
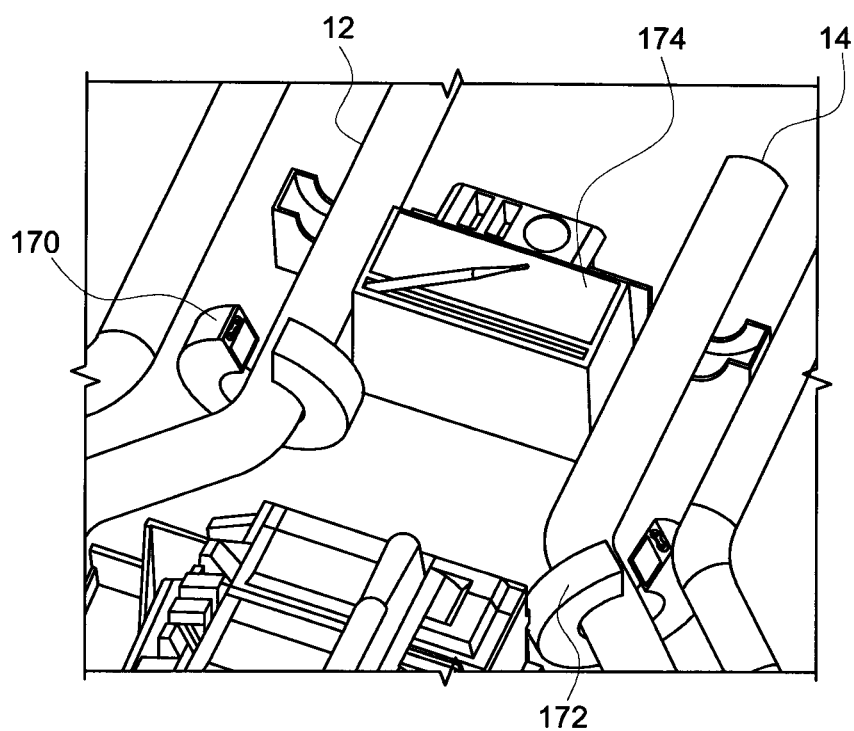
FIG. 34 illustrates a partial, close up, isometric view of the electrical distribution center of FIG. 32.
Figure 35:
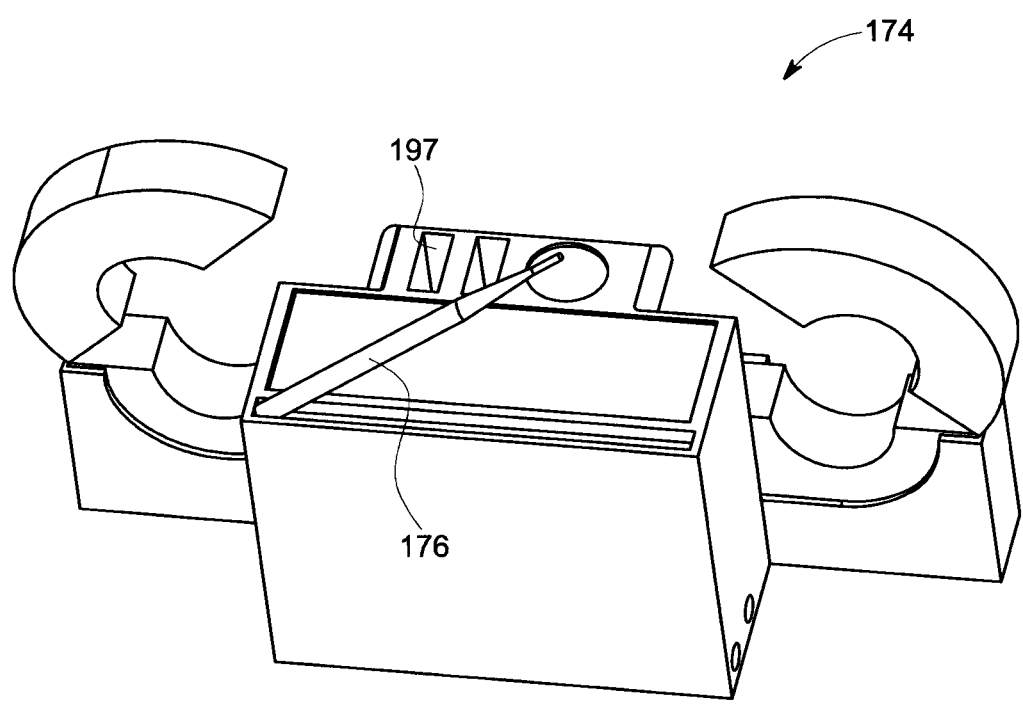
FIG. 35 illustrates an isometric view of an exemplary communications and processing hub.

FIG. 32 illustrates electrical distribution center 10 including an exemplary communications and processing hub 174 operable for wireless communications. FIG. 33 illustrates a close up, partial view of electrical distribution center 10 having exemplary communications and processing hub 174. FIG. 35 illustrates communications and processing hub 174 removed from electrical distribution center 10 for clarity. Communications and processing hub 174 is similar in operation to communications and processing hubs 152 and 168, with the exception that communications and processing hub 174 includes a wireless communications interface for transmitting and receiving data (e.g., data representing sensed operating conditions). In addition to the wireless communications interface, communications and processing hub 174 may include at least one wired communications port 197 as an alternative means of communication. In the exemplary embodiment, communications and processing hub 174 includes an antenna 176. In some embodiments, antenna 176 may be located remotely from the remainder of communications and processing hub 174. For example, because wireless distribution center 10 may be covered by a protective panel, it may be desirable to have antenna 176 positioned outside of electrical distribution center 10.

Figure 36:
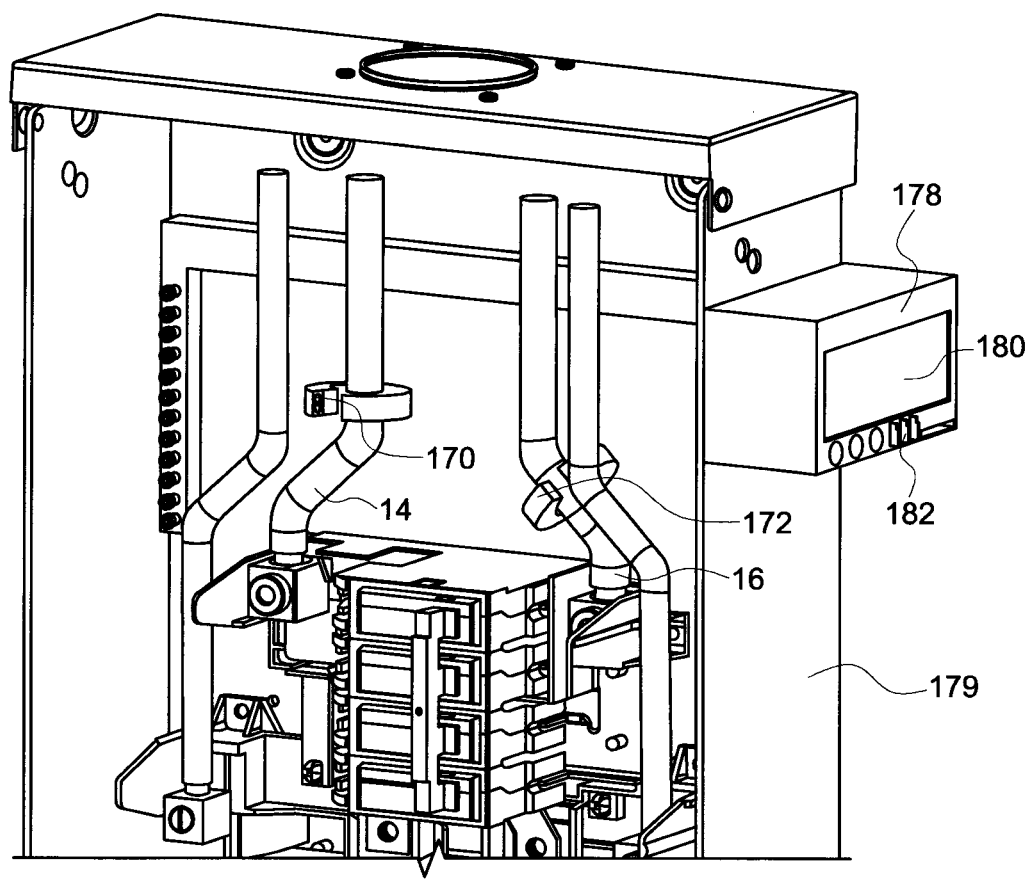
FIG. 36 illustrates a partial, isometric view of an electrical distribution center having an exemplary external communications and processing hub.

FIG. 36 illustrates a partial, close up view of electrical distribution center 10, demonstrating that first current transformer 170 and second current transformer 172 are moveable and may be repositioned along first current carrying wire 12 and second current carrying wire 14. FIG. 36 also illustrates an external communications and processing hub 178. External communications and processing hub 178 is mounted to an exterior surface 179 of electrical distribution center 10. In some embodiments, external communications and processing hub 178 may be mounted to a separate structure proximate electrical distribution center 10. External communications and processing hub 178 is similar to those discussed previously and may be operable for wired and/or wireless communications, having a display 180 and at least one communications port 182. First current transformer 170 and second current transformer 172 are disposed in electrical distribution center 10 about first current carrying wire 12 and second current carrying wire 14. In this embodiment, first current transformer 170 and second current transformer 172 may communicate with external communications and processing hub 178 over a wired connection or a wireless connection.

Figure 37:
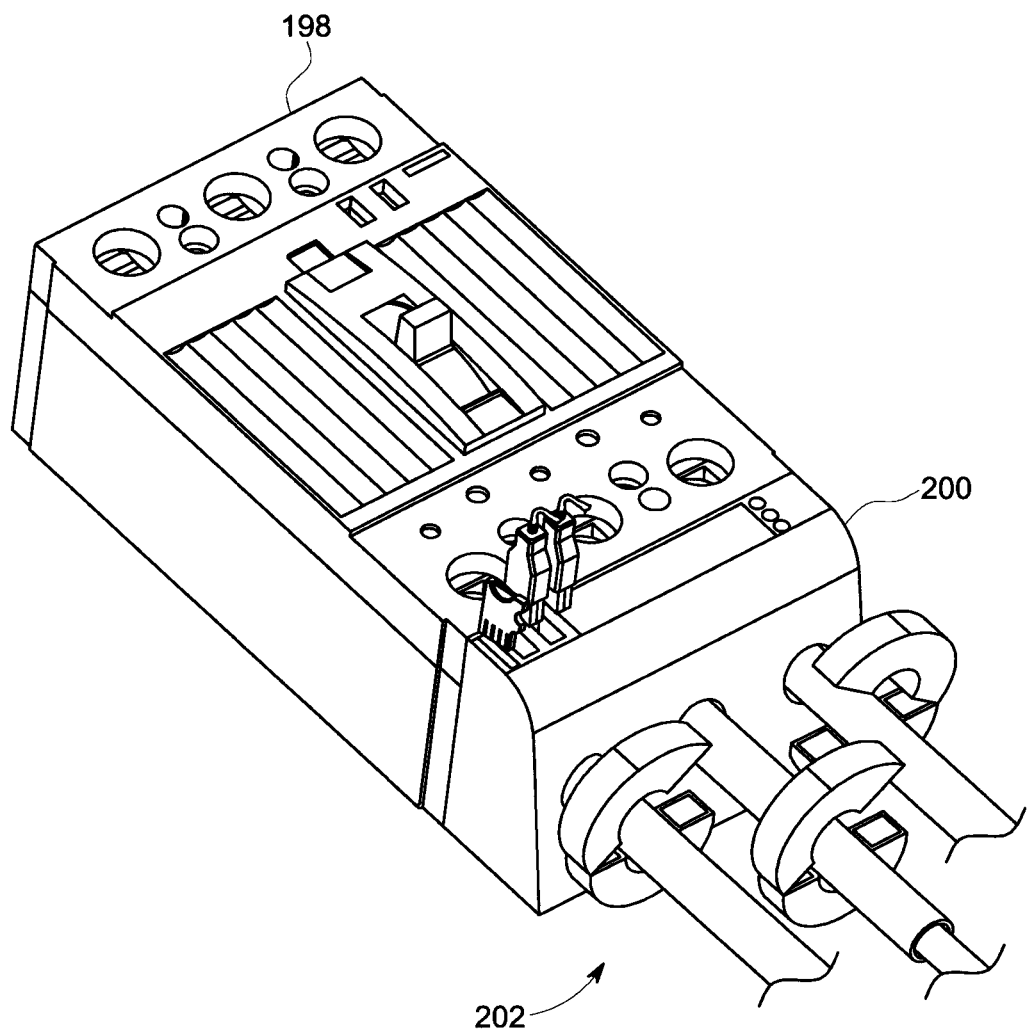
FIG. 37 illustrates an isometric view of an exemplary communications and processing hub coupled to a molded case circuit breaker.

FIG. 37 illustrates a molded case circuit breaker (MCCB) 198 coupled to a communications and processing module 200. MCCB 198 is similar to previously described circuit breakers, but is designed for relatively higher voltages and currents. Communications and processing module 200 operates similar to previously described communications and processing modules and includes sensors for measuring operating conditions, a microcontroller for storing data representing operating conditions, at least one communications interface for communicating with a remote computing device, and a display.

In the exemplary embodiment, communications and processing module 200 includes externally mounted current transformers 202. Current transformers 202 are in electrical communication with a microcontroller (not shown) contained in communications and processing module 200 and sense current passing through respective current carrying lines. The microcontroller is operable to store data representing the sensed conditions on a removable memory card. Alternatively, or additionally, data representing the sensed conditions may be transmitted to an external device through a wired communications interface or a wireless communications interface.

Figure 38:
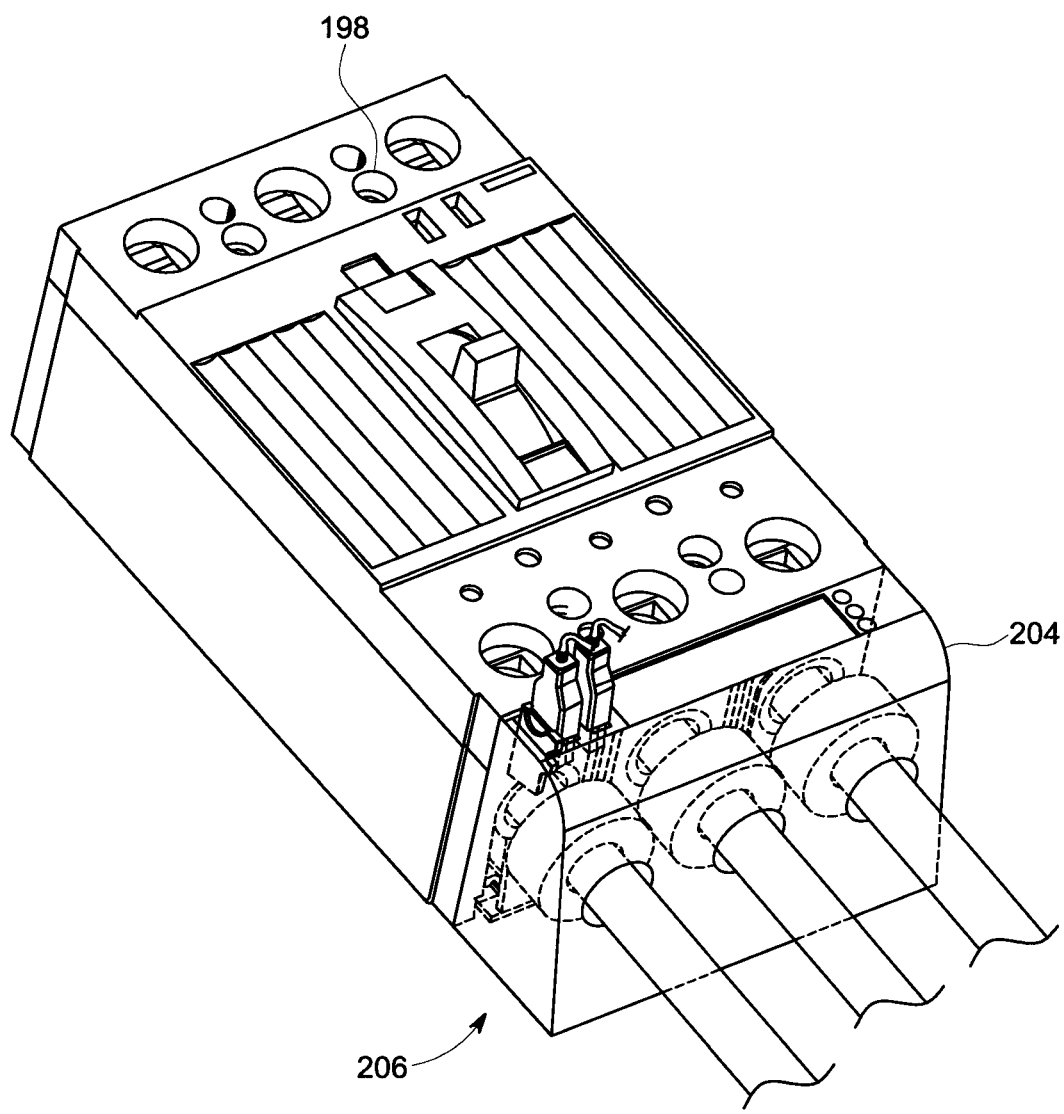
FIG. 38 illustrates an isometric view of an exemplary communications and processing hub coupled to a molded case circuit breaker.

FIG. 38 illustrates MCCB 198 coupled to an alternative exemplary communications and processing module 204. Communications and processing module 204 is similar to communications and processing module 200, but includes current transformers 206 within (as opposed to external to) communications and processing module 204.

Figure 39:
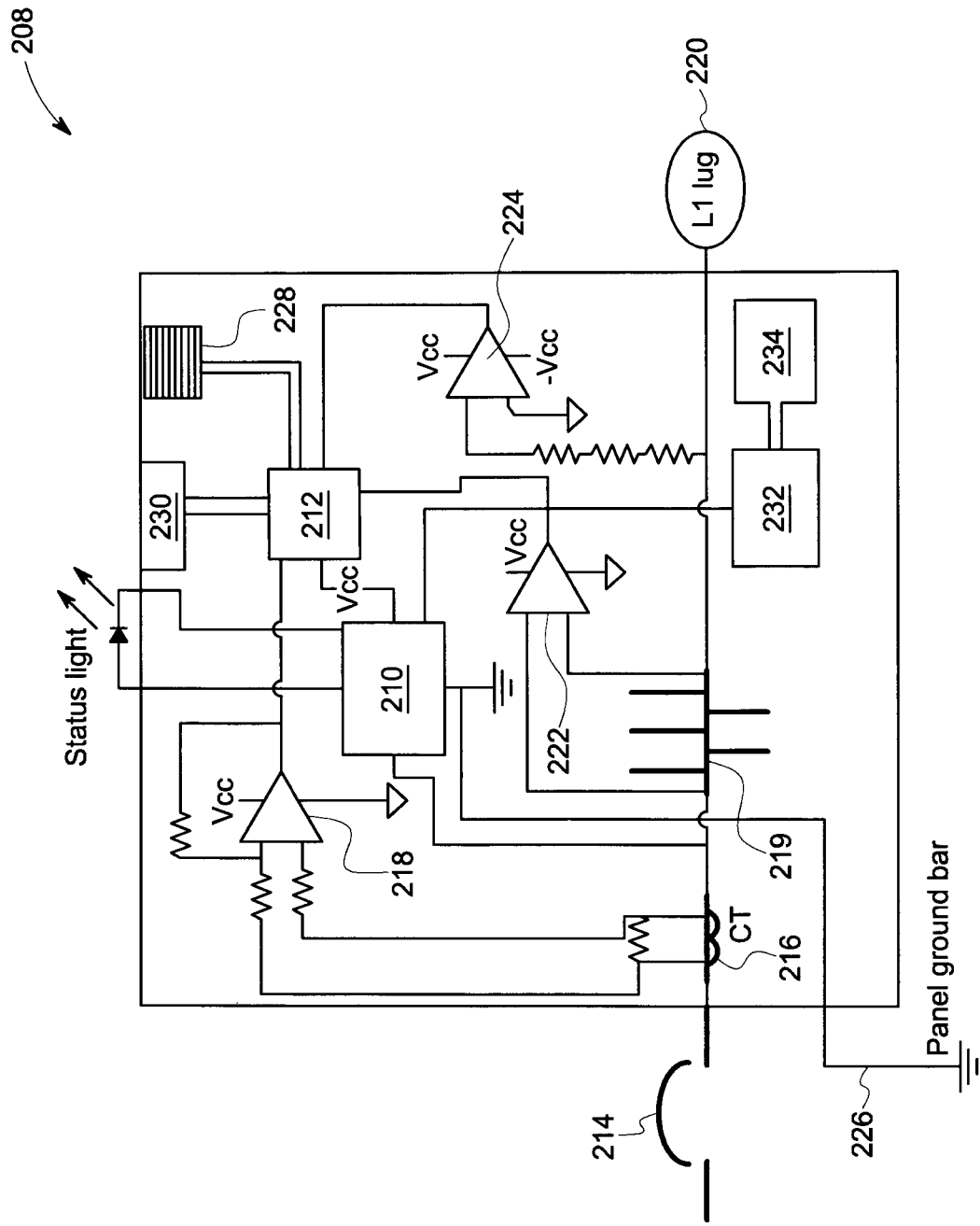
FIG. 39 illustrates a circuit diagram of an exemplary communications and processing module.

FIG. 39 illustrates a schematic diagram of circuitry 208 of an exemplary communications and processing module, such as those described in detail herein. Circuitry 208 includes a power supply 210 operable to provide a supply voltage to a microcontroller 212. In the exemplary embodiment, a circuit breaker 214 provides a supply current, which is stepped down by a current transformer 216. A first current sensor 218 senses the stepped down current, which is proportional to the supply current. The sensed current is communicated to microcontroller 212. The supply current passes flows through a bus bar 219 and is supplied to a lug 220. A second current sensor 222 measures current flowing through bus bar 219, and communicates the sensed current to microcontroller 212 in the exemplary embodiment. Further, a voltage sensor 224 measures the voltage between lug 220 and a ground 226, and communicates the measured voltage to microcontroller 212.

Microcontroller 212 receives the sensed operating conditions from first current sensor 218, second current sensor 222, and voltage sensor 224, and records data indicative of the sensed operating conditions to a removable memory 228. In addition, in the exemplary embodiment, microcontroller 212 is in communication with at least one of a universal serial bus (USB) interface 230 for transmitting data to an external component and a near field communications interface 232 for communicating data to an external component through an antenna 234.

Figure 40:
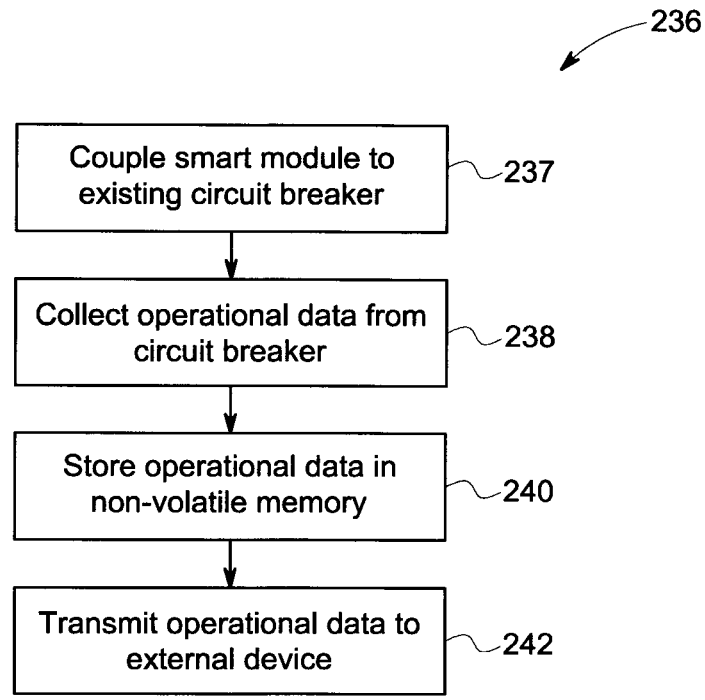
FIG. 40 illustrates a flow chart of an exemplary method for storing operational data.

FIG. 40 is a flow chart illustrating an exemplary method 236 for acquiring operating data from a circuit breaker. In block 237, a communications and processing module is coupled to a load lug of an existing circuit breaker. In block 238, operating data is collected from the circuit breaker. For example, microcontroller 212 may collect data sensed by first current sensor 218, second current sensor 222, and/or voltage sensor 224. In block 240, the operating data is stored to non-volatile memory. For example, microcontroller 212 may store the collected operating data to a removable memory. In block 242, the operating data is transmitted to an external device. In some embodiments, operation data may be transmitted by physically removing the removable memory and delivering it to an external device. In other embodiments, the operation data may be transmitted over a communications link such as USB interface 230 and/or near field communications interface 232. In still other embodiments, operating data may be transmitted using a combination of physical, wireless, and/or wired connection.

Figure 41:
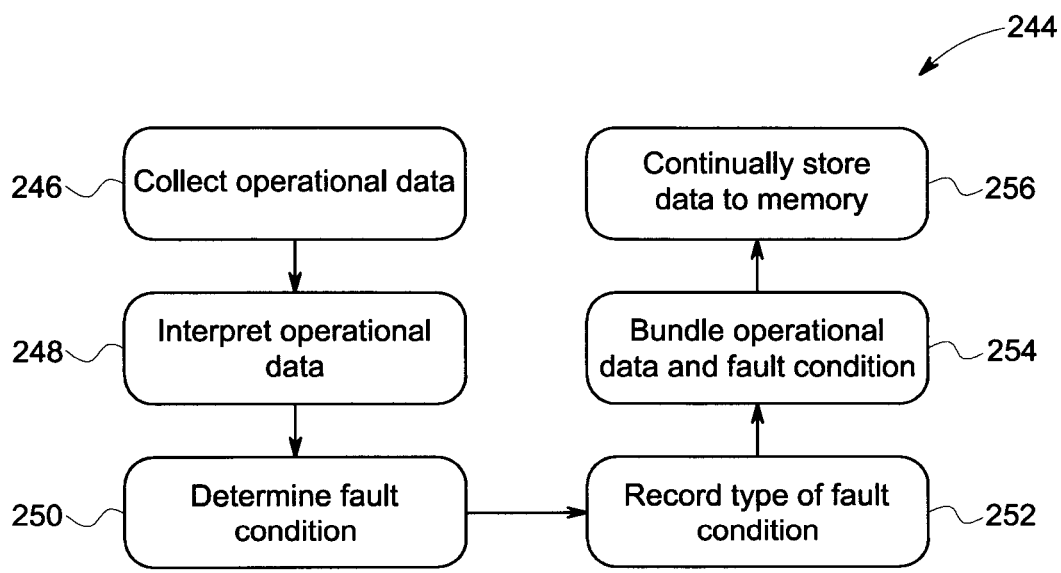
FIG. 41 illustrates a flow chart of an exemplary method for troubleshooting a circuit.

FIG. 41 is a flow chart illustrating an exemplary method 244 for distributing operating data of a circuit breaker. The method may be implemented by microcontroller 212 of a communications and processing module. In block 246, operating data is collected. The operating data may be data sensed by first current sensor 218, second current sensor 222, and/or voltage sensor 224. In block 248, the operating data is interpreted to a useful form. For example, a raw voltage value may be converted to a current value, or a digital signal may be converted to an operating condition. In block 250, the interpreted data is analyzed to determine if there are any fault conditions. This may be performed, using microcontroller 212, by comparing the interpreted data to pre-programmed limits and/or checking for particular operating conditions.

If a fault is determined in block 250, the type of fault condition is recorded at block 252. The operating data and any determined fault condition are then bundled at block 254. The bundled data is continually stored to memory at block 256. The memory may be internal non-volatile memory, a removable memory card, or the bundled data may be transmitted to an external device through a communications channel for storage at the remote computing device.

Figure 42:
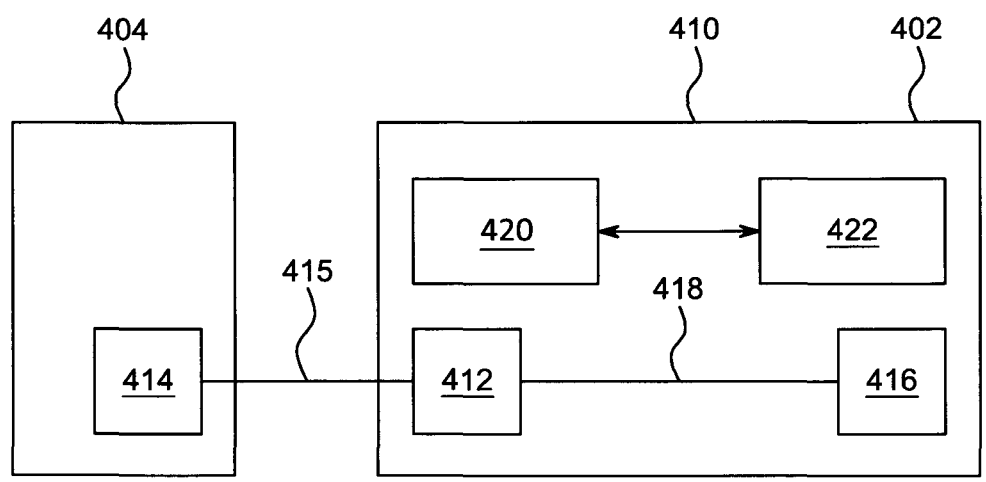
FIG. 42 is a block diagram of an exemplary communications and processing device coupled to a circuit breaker.

FIG. 42 is a block diagram of an exemplary communications and processing module 402 coupled to a circuit breaker 404. Communications and processing module 402 and circuit breaker 404 may be, for example, any of the communications and processing devices and circuit breakers described herein. Communications and processing module 402 includes a housing 410. At least one electrical contact 412 is positioned in the housing 410. Electrical contact 412 is electrically coupled to a load lug 414 of circuit breaker 404 via an electrical connection 415. Communications and processing device 402 further includes an output lug 416 positioned in housing 410. An electrical path 418 is defined between electrical contact 412 and output lug 416.

In the exemplary embodiment, at least one sensor 420 is positioned in housing 410. Sensor 420 is operable to sense at least one operating condition of circuit breaker 404. Further, at least one communications interface 422 is positioned in housing 410. Communications interface 422 is communicatively coupled to sensor 420, and may be, for example, any of the communications interfaces described herein.

Embodiments of communications and processing modules, as described above, thus facilitate the analysis of fault conditions, operating conditions, and general troubleshooting of a circuit having conventional circuit breakers. The communications and processing modules described herein are operable to continuously store operating conditions to non-volatile memory that may be local or remote. In addition, in at least some embodiments, the non-volatile memory may be removable from the communications and processing module.

Exemplary technical effects of the communications and processing module described herein include, for example: (a) enabling an existing conventional circuit breaker to have advanced communications and processing capabilities, (b) persistence of operating data through tripping conditions at the circuit breaker; (c) provide real-time indication of circuit faults; (d) and providing remote monitoring of operating conditions.

Exemplary embodiments of a communications and processing module and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiments can be implemented and utilized in connection with many applications where monitoring of a power circuit is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A kit comprising:
   a communications and processing module electrically coupleable to a first circuit breaker to provide the first circuit breaker with additional capabilities, the communications and processing module comprising:
      a housing;
      at least one electrical contact positioned in said housing and electrically coupleable to a load lug of the first circuit breaker;
      an output lug positioned in said housing and electrically coupleable to a current carrying line, wherein an electrical path is defined between said at least one electrical contact and said output lug;
      at least one sensor positioned in said housing and operable to sense at least one operating condition of the first circuit breaker; and
      at least one communications interface positioned in said housing and communicatively coupled to said at least one sensor, said communications interface operable to receive data from said at least one sensor that is indicative of the at least one sensed operating condition to facilitate exporting the received data to a remote computing device; and
   an adapter that is physically and electrically coupleable between the communications and processing module and a second circuit breaker sized differently than the first circuit breaker to allow the communications and processing module to provide the second circuit breaker with the additional capabilities.

2. The kit of claim 1, wherein said at least one electrical contact comprises one of a conductive spring and a conductive pin adapted to directly contact the load lug of the first circuit breaker.

3. The kit of claim 1, wherein the adapter includes (i) a first electrical contact that has a similar shape to the load lug of the first circuit breaker and is electrically coupleable to the at least one electrical contact of the communications and processing module and (ii) a second electrical contact that is electrically coupleable to a load lug of the second circuit breaker.

4. The kit of claim 3, wherein a first side of the adapter that includes the first electrical contact has a different profile than a second side of the adapter that includes the second electrical contact.

5. The kit of claim 4, wherein the second side of the adapter has a larger profile than the first side of the adapter.

6. The kit of claim 1, wherein said housing comprises a plurality of tabs, said plurality of tabs adapted to engage corresponding slots in a mounting rail to physically couple said communications and processing module to the mounting rail.

7. The kit of claim 1, wherein said housing comprises at least one engagement feature adapted to physically couple said communications and processing module to an adjacent communications and processing module.

8. The kit of claim 7, wherein said at least one engagement feature comprises a post adapted to engage a corresponding aperture formed on the adjacent communications and processing module.

9. The kit of claim 7, wherein said at least one engagement feature comprises a rail adapted to engage a corresponding slot formed on the adjacent communications and processing module.

10. The kit of claim 1, wherein the communications and processing module further comprises a display operable to dynamically display information associated with the at least one sensed operating condition.

11. The kit of claim 1, wherein said communications interface comprises at least one of a memory card interface, a wired communications interface, and a wireless communications interface.

12. An electrical distribution center comprising:
a circuit breaker comprising a load lug;
an adapter comprising (i) a first interface coupled to the circuit breaker and (ii) a second interface having a different profile than the first interface; and
a communications and processing module coupled to the second interface of the adapter, said communications and processing module comprising:
a housing;
at least one electrical contact positioned in said housing and electrically coupled to said load lug of said circuit breaker via the adapter;
an output lug positioned in said housing, wherein an electrical path is defined between said at least one electrical contact and said output lug;
at least one sensor positioned in said housing and operable to sense at least one operating condition of said circuit breaker; and
at least one communications interface positioned in said housing; and
communicatively coupled to said at least one sensor, said at least one communications interface operable to receive data from said at least one sensor that is indicative of the at least one sensed operating condition to facilitate exporting the received data to a remote computing device.

13. The electrical distribution center of claim 12, further comprising a mounting rail defining a plurality of slots, wherein said housing of said communications and processing module comprises a plurality of tabs, said plurality of tabs engaging corresponding slots of the plurality of slots to physically couple said communications and processing module to said mounting rail.

14. The electrical distribution center of claim 12, wherein said housing of said communications and processing module comprises at least one engagement feature configured to physically couple said communications and processing module to an additional communications and processing module.

15. The electrical distribution center of claim 14, wherein said at least one engagement feature comprises a post configured to engage a corresponding aperture formed on said additional communications and processing module.

16. The electrical distribution center of claim 14, wherein said at least one engagement feature comprises a rail configured to engage a corresponding slot formed on said additional communications and processing module.

17. The electrical distribution center of claim 12, further comprising:
at least one conductive wire electrically coupled to said circuit breaker, said at least one conductive wire configured to distribute power to said circuit breaker from an electrical power source; and
a communications and processing hub, said communications and processing hub comprising a current transformer operable to measure a current flowing through said at least one conductive wire.

18. The electrical distribution center of claim 12, wherein said communications interface comprises at least one of a memory card interface, a wired communications interface, and a wireless communications interface.

19. A method comprising:
electrically coupling an adapter to a load lug of a first circuit breaker;
electrically coupling a communications and processing module to the adapter such that the communications and processing module is electrically coupled to the first circuit breaker via the adapter, wherein the communications and processing module is not capable of directly coupling to the load lug of the first circuit breaker;
sensing, using the communications and processing module, at least one operating condition of the first circuit breaker; and
transmitting data indicative of the at least one sensed operating condition from the communications and processing module to a remote computing device.

20. The method of claim 19, further comprising:
decoupling the communications and processing module from the adapter; and
electrically coupling the communications and processing module directly to a load lug of a second circuit breaker without the adapter.

* * * * *